Dec. 23, 1947.  R. E. CROSS  2,433,201
MACHINE FOR CHAMFERING GEARS
Filed March 8, 1945  13 Sheets-Sheet 1
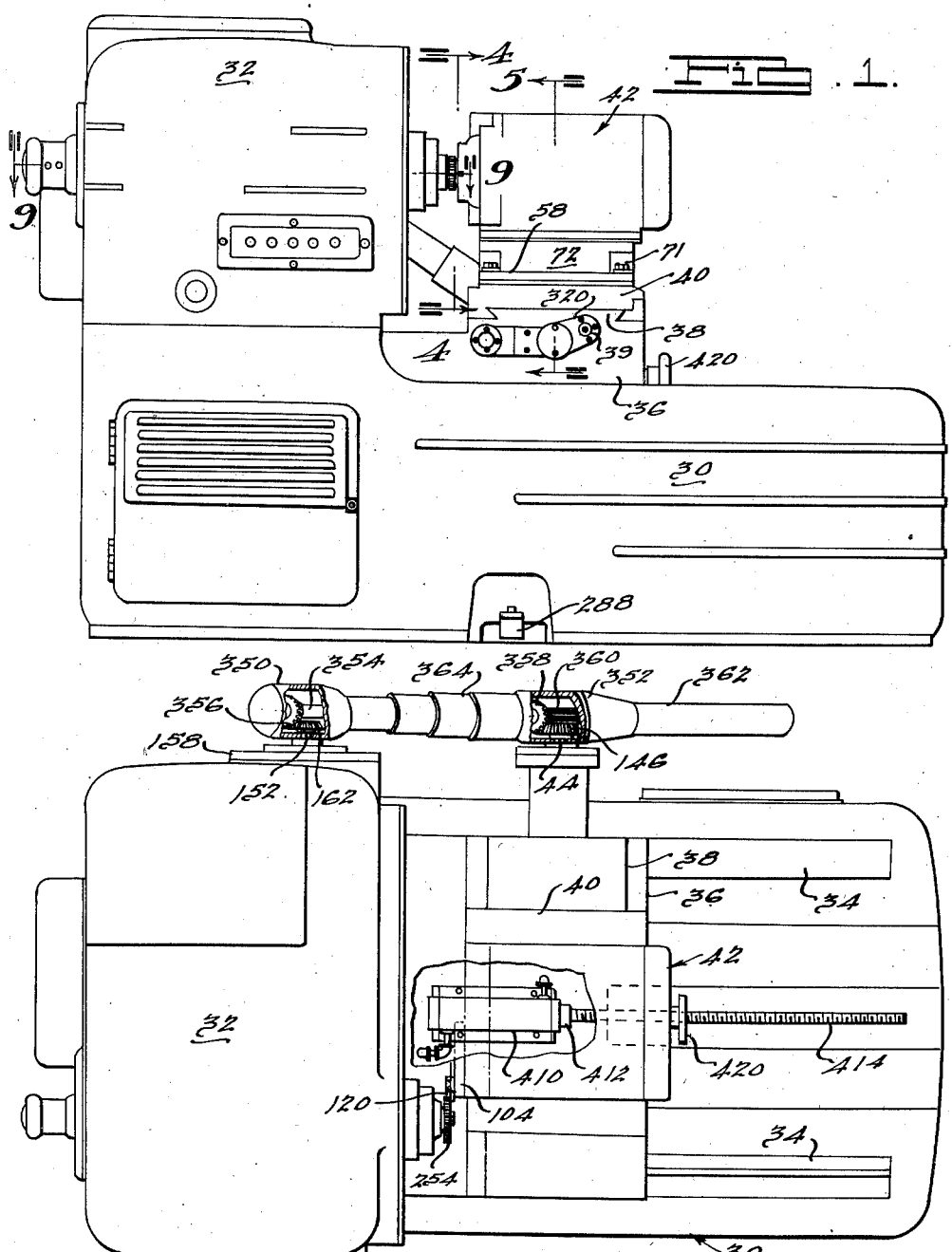
INVENTOR.
Ralph E. Cross.
BY
Harness Dickey & Pierce.
ATTORNEYS.

Dec. 23, 1947.   R. E. CROSS   2,433,201
MACHINE FOR CHAMFERING GEARS
Filed March 8, 1945   13 Sheets-Sheet 2

INVENTOR.
Ralph E. Cross.
BY
Harness, Dickey & Pierce
ATTORNEYS.

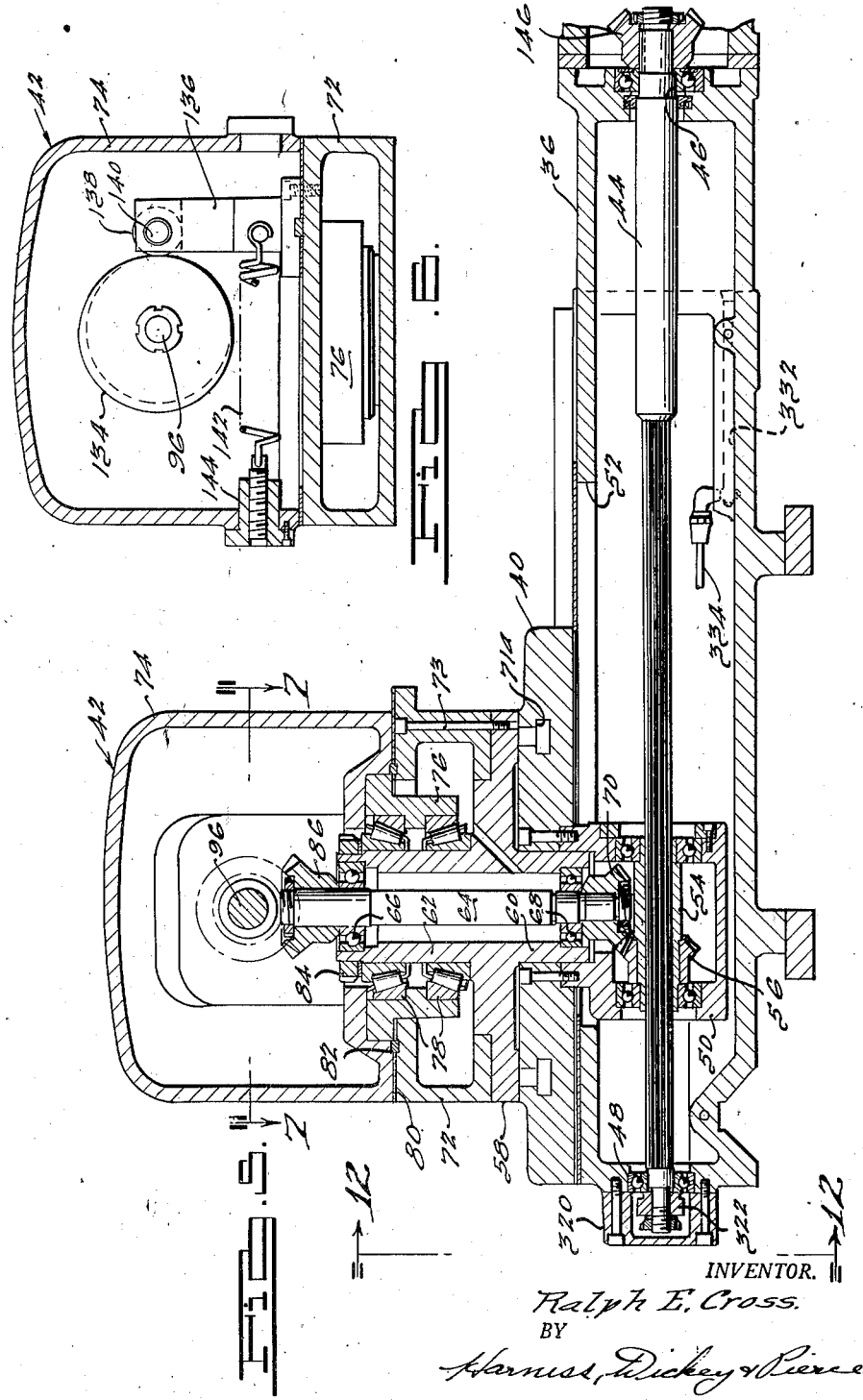

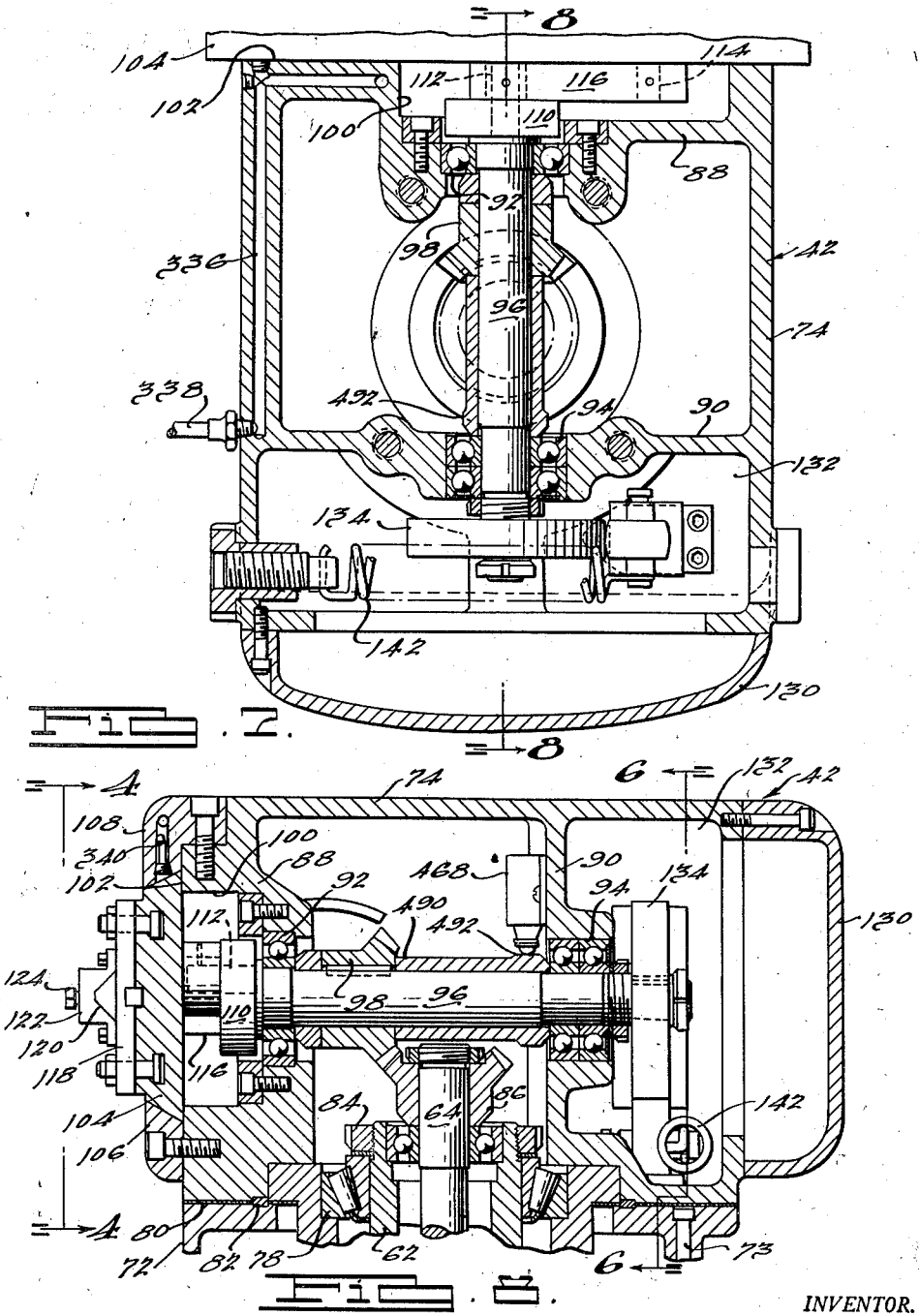

Dec. 23, 1947. R. E. CROSS 2,433,201
MACHINE FOR CHAMFERING GEARS
Filed March 8, 1945 13 Sheets-Sheet 5
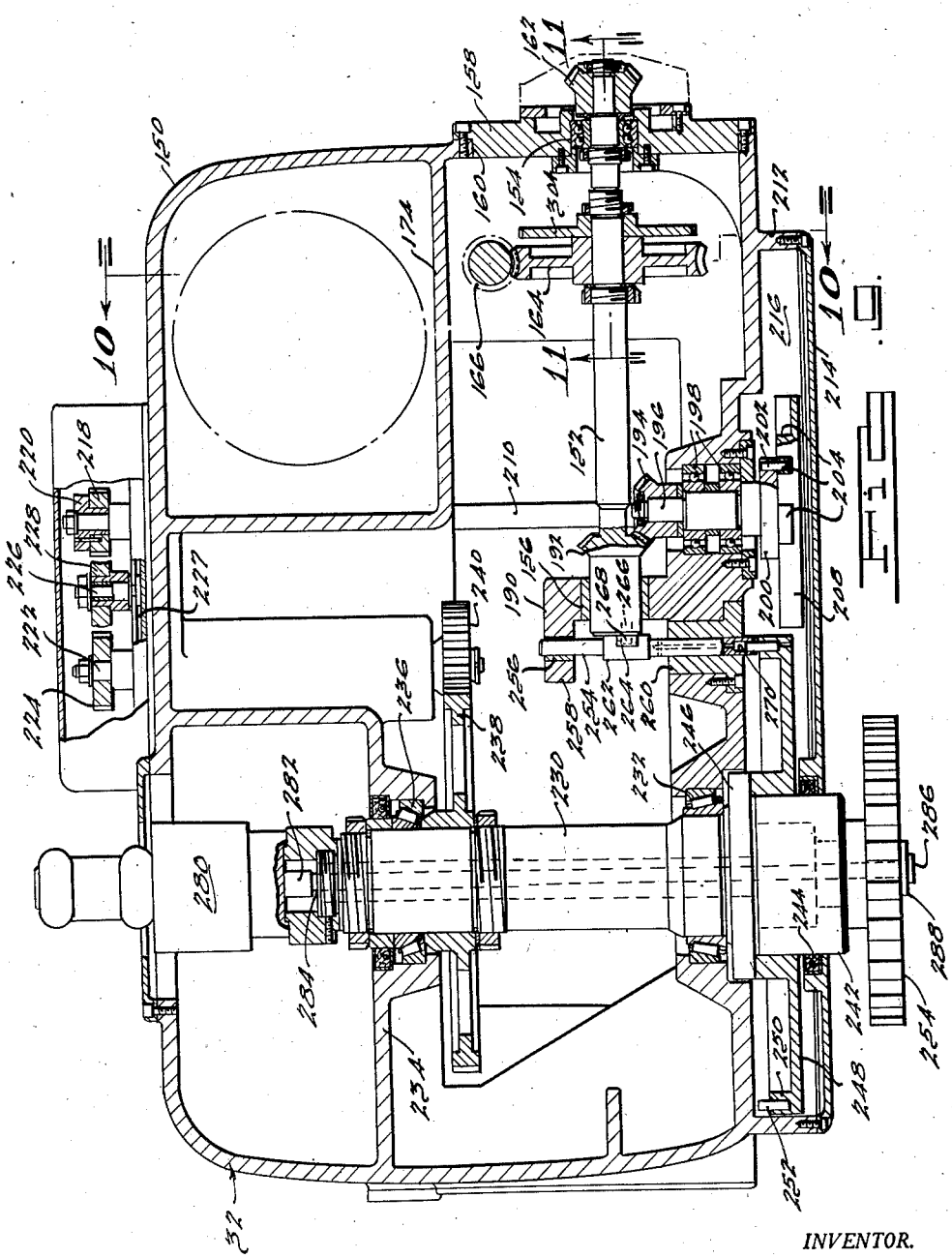
INVENTOR.
Ralph E. Cross.
BY
Harness, Dickey & Pierce.
ATTORNEYS.

Dec. 23, 1947.    R. E. CROSS    2,433,201
MACHINE FOR CHAMFERING GEARS
Filed March 8, 1945    13 Sheets-Sheet 6

INVENTOR.
Ralph E. Cross.
BY
Harness, Dickey & Pierce
ATTORNEYS.

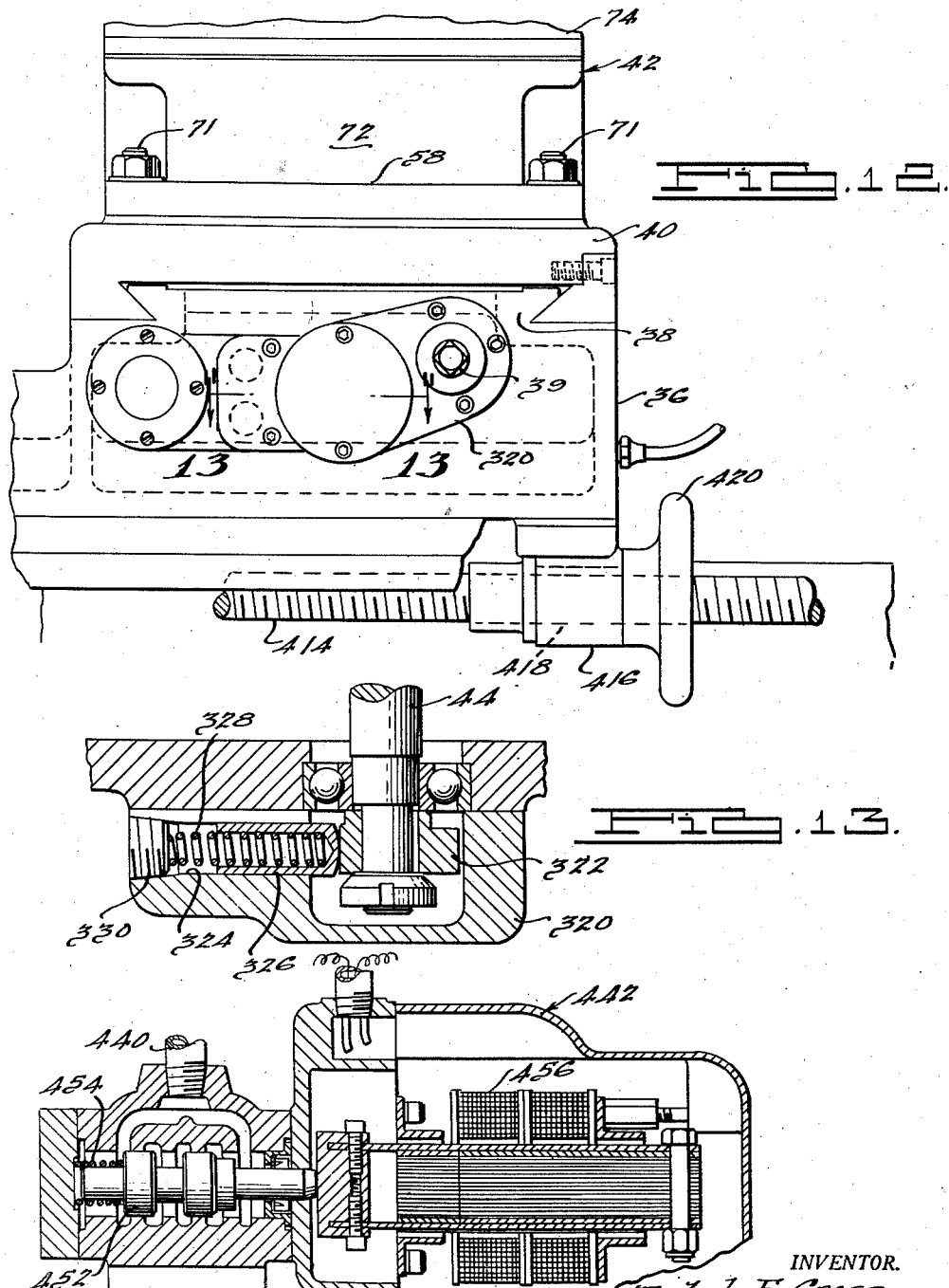

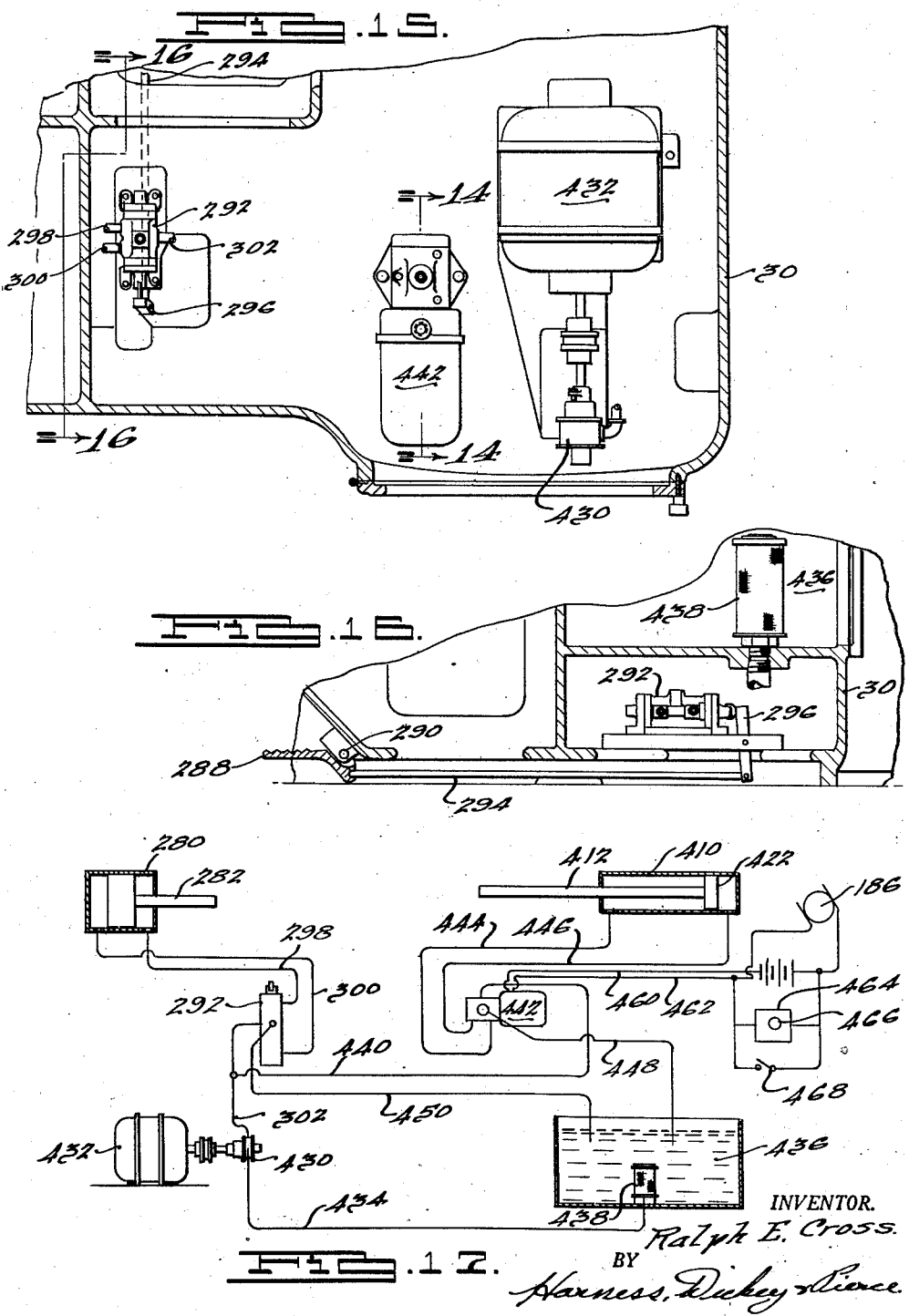

Dec. 23, 1947.   R. E. CROSS   2,433,201
MACHINE FOR CHAMFERING GEARS
Filed March 8, 1945   13 Sheets-Sheet 9
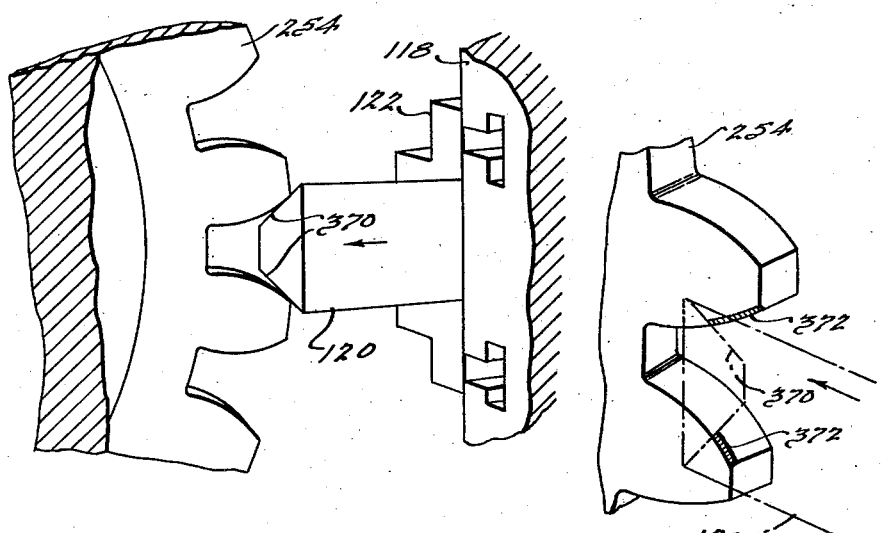
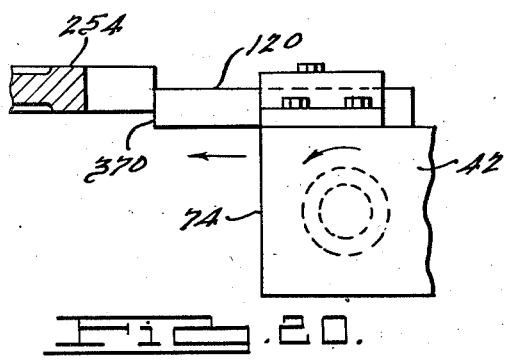
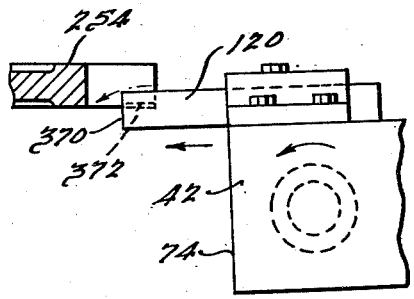
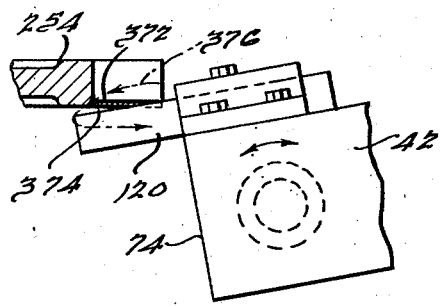
INVENTOR.
Ralph E. Cross.
BY
ATTORNEYS.

Dec. 23, 1947. R. E. CROSS 2,433,201
MACHINE FOR CHAMFERING GEARS
Filed March 8, 1945 13 Sheets-Sheet 10
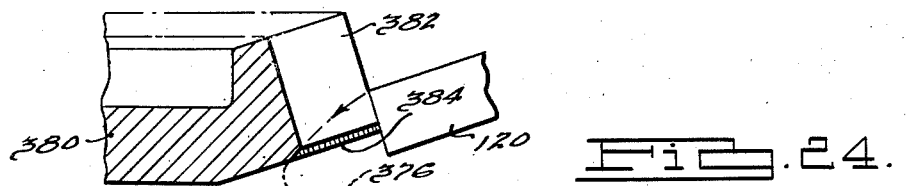
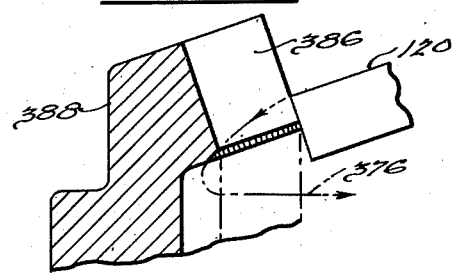
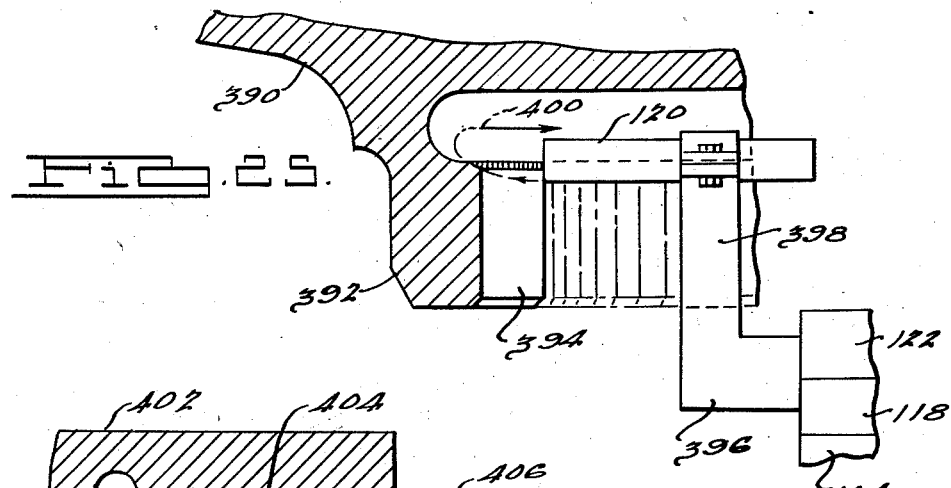
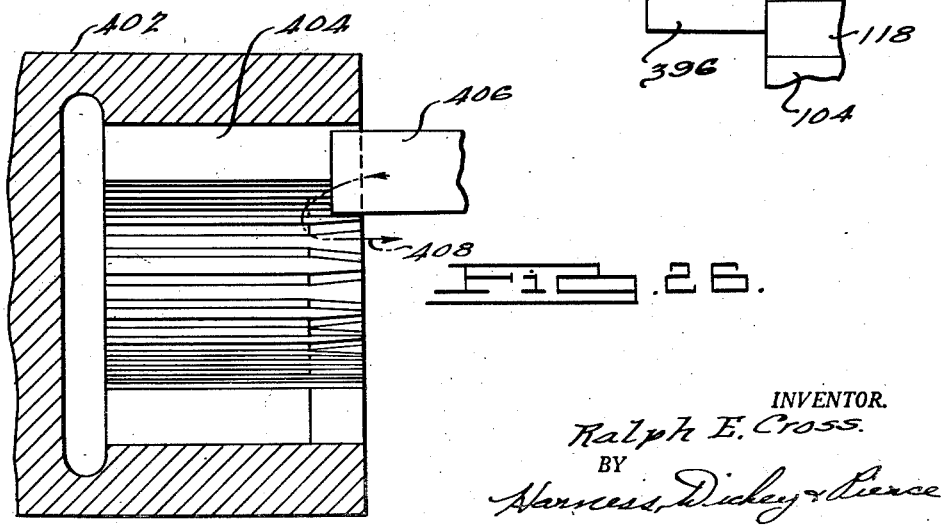
INVENTOR.
Ralph E. Cross.
BY
Harness, Dickey & Pierce
ATTORNEYS.

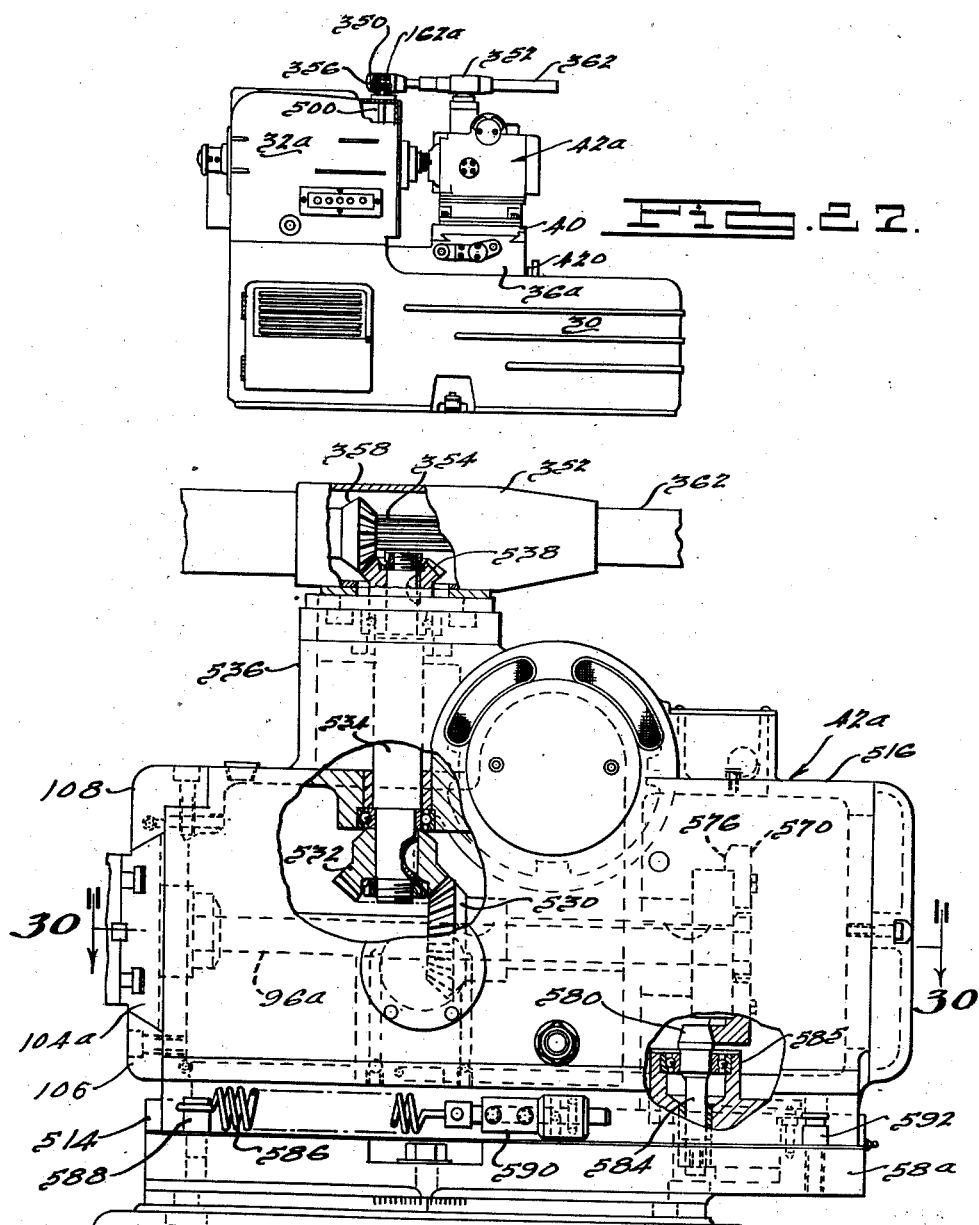

Dec. 23, 1947.  R. E. CROSS  2,433,201
MACHINE FOR CHAMFERING GEARS
Filed March 8, 1945  13 Sheets-Sheet 12

INVENTOR.
Ralph E. Cross.
BY
Harness, Dickey & Pierce.
ATTORNEYS.

Dec. 23, 1947.  R. E. CROSS  2,433,201
MACHINE FOR CHAMFERING GEARS
Filed March 8, 1945  13 Sheets-Sheet 13
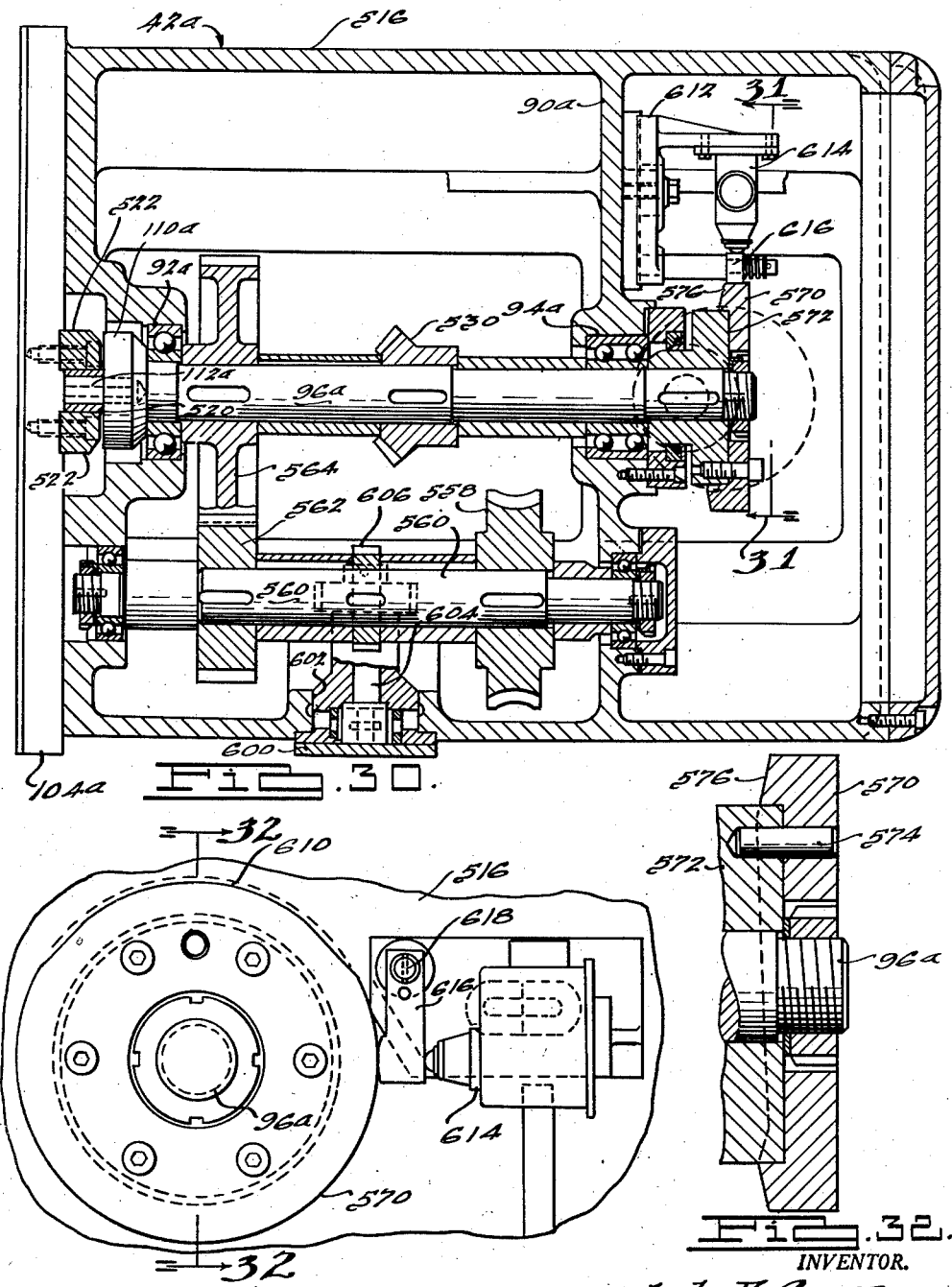
INVENTOR.
Ralph E. Cross.
BY
Harness, Dickey & Pierce.
ATTORNEYS.

Patented Dec. 23, 1947

2,433,201

UNITED STATES PATENT OFFICE 2,433,201

MACHINE FOR CHAMFERING GEARS

Ralph E. Cross, Grosse Pointe, Mich.

Application March 8, 1945, Serial No. 581,668

6 Claims. (Cl. 90—1.4)

This invention relates to machines for chamfering the teeth of gears, that is, chamfering the end edges thereof so as to remove burrs formed at such edges during machining of the teeth of the gears or for reducing the width of the ends of the teeth so as to enable two relatively axially movable gears to more readily be shifted axially with respect to each other into inter-meshing engagement.

Objects of the present invention include the provision of mechanism for chamfering gears by means of which a superior result may be obtained and one that will be more economical than existing machines in the chamfering of such gears, particularly in quantity production; the provision of gear chamfering apparatus that is readily adapted to the chamfering of the teeth of gears of different diameters, different tooth forms, to gears regardless of the number of teeth, and to a wide variety of types of gears; the provision of apparatus of the type described that is completely automatic in operation, requiring only the loading of the gears thereon and removal of the gears therefrom; the provision of apparatus of the type described including a reciprocable cutting element which is bodily moved simultaneously with its reciprocatory movement in a direction transverse to the direction of reciprocation to vary its operative relation with respect to the tooth of a gear chambered thereby; the provision of apparatus of the type described in which such transverse movement is a swinging movement; the provision of apparatus of the type described in which a second reciprocatory movement of the cutting element in a path transverse to the first-mentioned reciprocatory movement is provided to obtain the desired path of movement of the cutting element; the provision of apparatus of the type described in which the cutting element is so constructed and arranged as to simultaneously chamber the adjacent edges of adjacent teeth of a gear; the provision of a construction as above described in which the gear is automatically indexed to present consecutive teeth to the action of the cutting elements as an incident to the remaining operations of the apparatus; and the provision of apparatus of the type described including means for supporting a workpiece gear for rotation about its axis, for intermittently rotating the gear work blank about its axis, for reciprocating a cutting tool toward and from the gear work-piece in timed relation with respect to the intermittent rotational movements thereof, and for shifting the cutting tool in a direction transverse to said reciprocation simultaneously with said reciprocatory movement thereof.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views, Fig. 1 is a side elevational view of a gear chamfering machine constructed in accordance with the present invention;

Fig. 2 is a partially broken plan view of the machine shown in Fig. 1;

Fig. 5 is an enlarged, fragmentary, vertical sectional view taken on the line 5—5 of Fig. 1 and illustrating the mounting of the oscillatory cutter carrying head and the drive thereto;

Fig. 6 is a vertical sectional view through the oscillating cutter carrying head, taken as on the line 6—6 of Fig. 8 and illustrating the means employed for effecting oscillation of the head;

Fig. 7 is an enlarged, horizontal sectional view through the oscillating head taken on the line 7—7 of Fig. 5 and illustrating the means employed in conjunction with the oscillating head for effecting reciprocation of the cutter carrier;

Fig. 8 is a vertical sectional view taken centrally through the oscillating head as on the line 8—8 of Fig. 7;

Fig. 9 is an enlarged, horizontal sectional view taken through the fixed portion of the machine and on the axis of the work supporting spindle, particularly bringing out the mechanism employed for intermittently rotating the work supporting spindle;

Fig. 12 is an enlarged, fragmentary, front elevational view of that portion of the machine shown in Fig. 1 including the dovetail for supporting the slide which carries the oscillatory cutter carrying head and bringing out certain details thereof employed in conjunction with the adjustment thereof;

Fig. 13 is an enlarged, fragmentary, horizontal sectional view taken on the line 13—13 of Fig. 12;

Fig. 14 is a vertically sectioned view taken on the line 14—14 of Fig. 15 axially through the electrically operated control valve for controlling the movement of the cutter carrying head away from operative position upon the completion of chamfering of a gear and for returning it to such position when a new gear work blank has been mounted upon the work carrying spindle;

Fig. 15 is a fragmentary, sectional view taken on the line 15—15 of Fig. 3 and illustrating the arrangement of certain of the control mechanism for the machine;

Fig. 16 is a fragmentary, vertical sectional view taken on the line 16—16 of Fig. 15;

Fig. 17 is a diagrammatic view illustrating the control mechanism for positioning the cutter carrying head in operative and inoperative position;

Fig. 18 is a fragmentary, perspective view illustrating the relation of the cutting tool with respect to the teeth of a spur gear which are to be chamfered thereby by the use of the machine shown in the preceding figure;

Fig. 19 is a fragmentary, perspective view of the gear shown in Fig. 18, together with the cutter shown in dot-and-dash lines, illustrating the form of chamfer imparted to the teeth of the gear thereby;

Fig. 20 is a fragmentary, diagrammatic view illustrating the relationship existing between the cutter and the teeth of the gear at the initiation of a chamfering of the former on the latter;

Fig. 21 is a view similar to Fig. 20 but illustrating the relation of the parts at an intermediate point in the cutting operation;

Fig. 22 is a view similar to Figs. 20 and 21 but illustrating the relation of the parts at the completion of a cutting operation and at the moment the cutting element is about to begin its return movement;

Fig. 23 is a fragmentary, more or less diagrammatic view illustrating the path of movement of the cutting element with respect to the axially outer ends of the teeth of a beveled gear during a chamfering operation on the same in accordance with the present invention;

Fig. 24 is a view illustrating the relative position and relative movement of the parts where the apparatus of the present invention is employed for chamfering the inner ends of the teeth of a beveled gear;

Fig. 25 is a fragmentary, more or less diagrammatic view illustrating the application of the present invention to the chamfering of the inner ends of the teeth of an internal gear;

Fig. 26 is a fragmentary, more or less diagrammatic view illustrating the application of the present invention to the chamfering of the outer end of the splines of an internally splined member;

Fig. 27 is a view somewhat similar to Fig. 1 but illustrating a modified form of construction;

Fig. 28 is an enlarged, fragmentary, partially broken, partially sectioned, side elevational view of the cutter or shaper head for the machine shown in Fig. 27;

Fig. 30 is an enlarged horizontal sectional view of the shaper or cutter head shown in Fig. 28 on the line 30—30 of Fig. 28;

Fig. 31 is an enlarged, fragmentary view taken on the line 31—31 of Fig. 30 showing the cam in end view and in cooperative relationship with respect to the switch employed for controlling the point at which the cam is stopped in its rotation upon the completion of a piece of work; and Fig. 32 is an enlarged, fragmentary, sectional view taken on the line 32—32 of Fig. 31.

Figure 3:
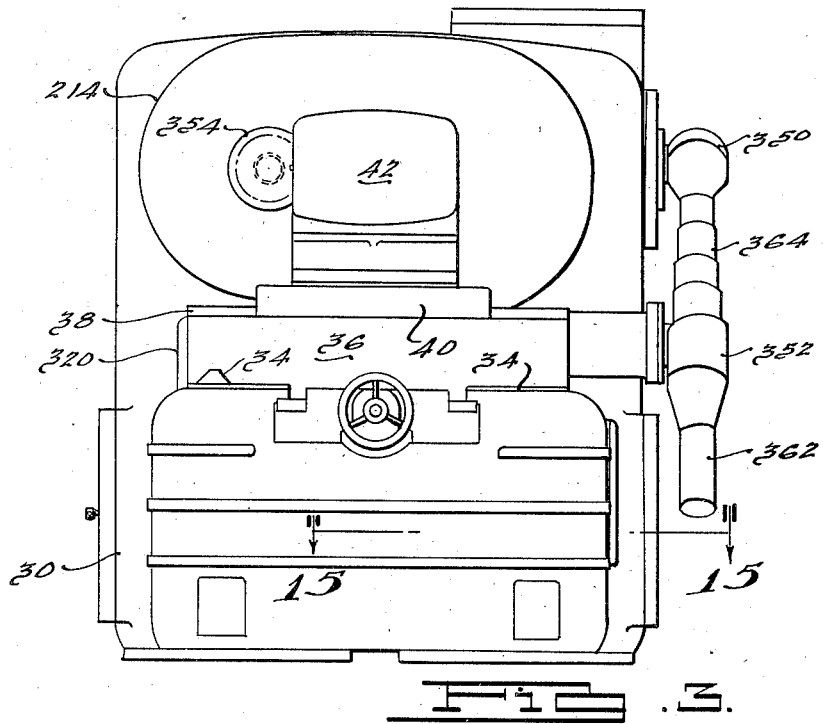
Fig. 3 is an end elevational view of the machine shown in the preceding figures taken as looking at the right hand end thereof as viewed in Figs. 1 and 2.

The present invention may be briefly described as mechanism by means of which a toothed member, such as a gear, the teeth of which are to be chamfered, is suitably mounted and intermittently rotated so as to bring each tooth in turn into the correct position to be operated upon by the cutting tool. The cutting tool itself is mounted for reciprocation generally in the plane of the end of the tooth to be chamfered. In view of the fact that the edge of a tooth to be chamfered is not ordinarily a straight line but is curved, it will be appreciated that reciprocatory movement alone is not sufficient in such case to provide a constant amount of chamfer for the edge of the tooth. For this reason it is necessary that the cutting tool have a movement in addition to the reciprocatory movement thereof and in accordance with the present invention this is accomplished by shifting the cutting element during such reciprocation in a direction transverse to the line of such reciprocation. Such shifting of the cutting tool may be accomplished in any suitable manner. For instance, it may be accomplished by swinging the cutting element, during its reciprocatory movement, about a pivotal axis in such a manner that the cutting element may have a constant depth of cut with respect to the edge of the tooth being chamfered. On the other hand, it may have a second reciprocatory movement imparted to it to effect the same ultimate result. The mechanism is such that the movement of the tool may be varied to accommodate it to any tooth edge curvature that a piece of work may have and in fact it may be adjusted to chamfer the edges of straight sided teeth if necessary.

The mechanism of the present invention is, furthermore, adapted to the chamfering of substantially all types of gears whether these be spur, ring, bevel, or internal gears and whether they be of the spiral or straight tooth type. Furthermore, it is adapted to the chamfering of the ends of splines which may be formed either externally of a piece of work or within the bore thereof.

While the mechanism of the present invention may be constructed to chamfer one edge of one tooth of a gear at a time, it will be appreciated that in the interests of high productivity it is preferable to chamfer two edges simultaneously and in the preferred embodiments of the invention shown in the drawings by way of illustration the arrangement is such that during each reciprocatory movement of the cutter it simultaneously chamfers the adjacent edges of two adjacent teeth. By the same token it may, as will be appreciated, be designed for use, as by the use of a differently formed cutting element, to chamfer both edges of the same tooth, but the former method is shown in the drawings by way of illustration.

The reciprocatory movements of the cutter are, of course, effected in timed relation with respect to the indexing mechanism for intermittently turning the workpiece and this indexing mechanism is so constructed and arranged as to permit its adjustment to accommodate a single machine to the chamfering of gears having different numbers of teeth and, of course, the machine is adjustable additionally to provide for the chamfering of gears having relatively widely different diameters.

The mechanism or machine of the present invention is essentially a high production machine and in carrying out this function means are preferably provided whereby upon completion of the chamfering operations on one face of the gear the machine is automatically stopped and the work is exposed for ready removal and replacement by an unmachined part or face. Thus once the machine is set up for production all that may be necessary for a workman to do is to apply and remove the work from the machine and simply press a button after work has been applied thereto in order to set the machine in operation.

Reference has heretofore been made regarding the obtaining of a constant depth of cut of the cutter with respect to the work during the chamfering operation. While ordinarily it will be appreciated that this will be preferable, there may be instances where it may be desired to vary the amount of chamfer over the length of a tooth and this may be readily accomplished by the use of the present invention as will hereinafter be more fully appreciated from the description thereof.

Now, referring to the accompanying drawings and particularly to Figs. 1, 2 and 3 it will be seen that the machine in question comprises a hollow cast metal base 30 upon one end of which is fixed what may be termed a work head indicated generally at 32 and in which is mounted the mechanism for supporting the workpiece and driving it in the desired intermittent motion. The work head 32 may also contain the driving motor as will hereinafter be more specifically brought out.

As best brought out in Figs. 2 and 3 at the end of the base 30 opposite the work head 32, the base 30 on its upper surface is provided with horizontally arranged ways 34 extending longitudinally of the base 30, that is to right and left as viewed in Fig. 2. Upon the ways 34 is received a slide 36 and which, therefore, is movable toward and from the work head 32. The slide 36 in turn is formed on its upper face with a horizontal dovetail 38 extending transversely to the length of the ways 34 and a slide 40 is mounted on the dovetail 38. Conventional manually rotatable screw means 39 cooperate between the slide 36 and the slide 40 to permit the position of the slide 40 to be adjusted on the dovetail 38. A detailed showing of such screw means is not given inasmuch as it is of a conventional type well recognized by those skilled in the machine tool art. The slide 40 in turn supports the cutter or shaper head indicated generally at 42. In the particular construction shown in Figs. 1 to 8, inclusive, the cutter head 42 includes means for supporting and reciprocating a cutting tool and for causing a pivotal movement of the cutting tool during the reciprocation where necessary and as previously described. This mechanism is suitably connected with the indexing mechanism in the work head 32 so that both mechanisms operate in timed relation with respect to each other.

Now, referring to Fig. 5, which is a fragmentary, vertical sectional view taken transversely of the machine on the line 5—5 of Fig. 1 and particularly through the cutter head 42 thereof and the driving mechanism therefor where employing the swinging type of cutter or shaper head as brought out in Figs. 1 to 8, inclusive, it will be noted that the slide 36 is hollow and is provided therein with a transverse shaft 44 bridging the opposite side walls thereof and supported in such walls by the anti-friction bearings 46 and 48, respectively. The slide 40 which is mounted thereon has fixed to its lower face a housing 50 which projects down through a slot 52 in the upper wall of the slide 36. Rotatably but relatively fixed against axial movement in the housing 50 in concentric relation with respect to the shaft 44 is a sleeve member 54 which is splined to the shaft 44 for equal rotation therewith but is free to move axially with respect thereto. The sleeve member 54 has fixed to it within the housing 50 a bevel gear 56.

The cutter or shaper head 42 includes a base 58 received in flat contacting relationship with respect to the upper face of the slide 40 and it is provided with a depending central sleeve 60 which is received in piloted relationship with respect to a complementary opening formed vertically through the slide 40. It is also provided with an integral upwardly projecting sleeve 62 concentric with the sleeve 60 and within these sleeves is mounted a vertically directed shaft 64. A bearing 66 is provided between the shaft 64 and the upper end of the sleeve 62 and a similar bearing 68 between the shaft 64 and the lower end of the sleeve 60. The lower end of the shaft 64 projects within the housing 50 where it is provided with a bevel gear 70 in meshing relationship with respect to the bevel gear 56. The base 58 is clamped to the slide 40 by bolts 71 (best shown in Figs. 1 and 12) the heads of which are received in a circular T-slot 71a (Fig. 5) formed in the upper face of the slide 40. By this means the base and, therefore, the cutter or shaper head 42 may be adjusted to any desired normal position on the slide 40 about the axis of the sleeve 60.

A ring member 72 is fixed to the upper face of the base 58 by screws or bolts 73 and is provided with a flat upper surface normal to the axis of the shaft 64 and seated upon such upper surface is the housing proper 74 of the cutter head 42. The housing 74 concentrically with the shaft 64 and sleeve 62 has fixed to its lower face a depending bearing ring 76 between which and the periphery of the sleeve 62 are mounted suitable anti-friction bearing assemblies 78 which mount the housing 74 for rotation about the axis of the shaft 64. A ring 80 of sheet brass or other suitable anti-friction material may be interposed between the matching faces of the ring member 72 and the housing 74 as shown, and preferably a ring 82 of felt or the like is also interposed between such surfaces to prevent the entrance of dust or other foreign material to the bearings 78. It will be noted that a nut 84 threaded on the upper end of the sleeve 62 cooperates through the inner race of the upper bearing 78 to limit axial play between the housing 74 and the sleeve 62 and, therefore, with respect to the slide 40 and that the housing 74 is thus mounted for rotational movement on the slide 40 about the axis of the shaft 64. It will also be noted that the shaft 64 has fixed to its upper end within the housing 74 a bevel gear 86.

Referring now to Figs. 7 and 8 it will be noted that the cutter or shaper head housing 74 is provided with a pair of transverse walls 88 and 90 which are centrally apertured to receive the anti-friction bearing assemblies 92 and 94, respectively. These bearings rotatably support the horizontal shaft 96 which has fixed thereto between the bearings a bevel gear 98 which lies in mesh with the gear 86. Outwardly of the wall 88 the housing 74 is formed to provide a pocket or chamber 100 which is bounded at its outer end in a flat face 102 formed on the corresponding end of the housing 74. Against the flat face 102 a tool slide 104 is received. The upper and lower edges of the tool slide 104 are beveled as best shown in Fig. 8 and are complementarily received by way strips 106 and 108 secured to the corresponding end of the housing 74. These way strips cooperate with the flat face 102 of the housing 74 to provide a dovetail for receiving the slide 104 and guiding it for reciprocatory movement in a horizontal direction.

Figure 4:
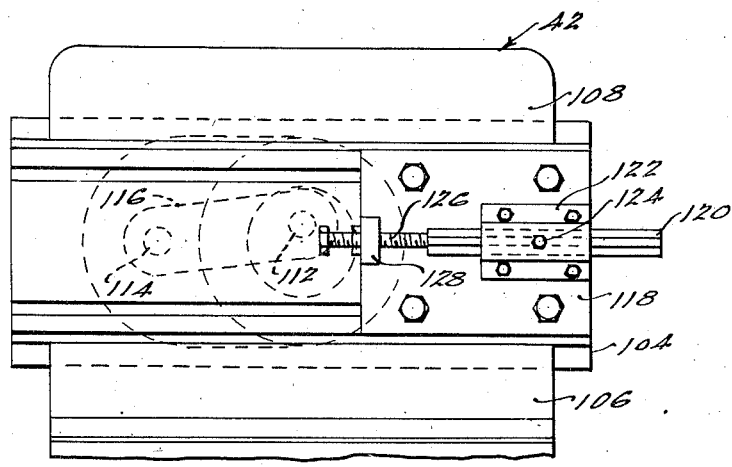
Fig. 4 is an enlarged fragmentary view taken looking in the direction of the arrows 4—4 in Fig. 1, showing the reciprocatory slide which carries the cutting element and the cutting elements mounted thereon and more specifically in the direction of the arrows 4—4 of Fig. 8.

Reciprocation is imparted to the slide 104 in the following manner. The end of the shaft 96 projecting through the wall 88 is provided with an enlarged head 110 to which is fixed and from which projects a pin 112 arranged with its axis in parallel but eccentric relation with respect to the axis of the shaft 96. Reference also to Fig. 4 will aid in the understanding of this part of the structure. An inwardly projecting pin 114 is fixed to the slide 104 and projects to within the chamber 100. A short link 116 is pivotally connected at its opposite ends to the pins 112 and 114, respectively. It will thus be appreciated that as the shaft 96 rotates the pin 112 is caused to move in a rotary path and being connected by the link 116 to the pin 114 which is fixed to the tool slide 104, the tool slide 104 is caused to reciprocate in conformance therewith.

While in the broader aspects of the invention it will be appreciated that the cutting tool may be mounted on the cutter slide 104 in any suitable or conventional manner, in the particular construction illustrated a plate member 118 is suitably bolted to the outer face of the tool slide 104. The cutting tool or cutter is illustrated at 120 and as being fixed to the plate 118 by means of a clamping member 122 and clamp screw 124, the tool in such case projecting beyond the right-hand end of the tool slide 104 as brought out in Fig. 4. For permitting a fine control of the axial position of the cutter blade 120 a screw 126 threaded through a lug 128 integral with the plate 118 is arranged in parallel relation with respect to the path of movement of the tool 120 between the clamp 122 and the plate 118 and in abutting relationship with respect to the inner end of the cutter 120.

From the description thus far given it will be appreciated that the mechanism provided includes means for mounting the cutter 120 for reciprocatory movement on the cutter or shaper head 42 in a horizontal direction and in a straight line movement with respect thereto. The following mechanism is provided in the construction thereof shown in Figs. 1 to 8 for simultaneously imparting a movement to the cutter blade which will cause it to follow a curved path, this being required for the reasons heretofore given. It will be noted in Figs. 7 and 8 that the transverse wall 90 is spaced inwardly from the corresponding end of the housing 74 and such end is open but is closed by a removable cap or cover 130, thus forming a chamber 132 between the wall 90 and the cover 130. The shaft 96 projects into the chamber 132 and is there provided with a peripheral type of cam 134 fixed to it. The bottom wall of the housing 74 below the cam 134 is cut away so as to expose the upper face of the member 72 and fixed to the upper face of the member 72 within such cut-away portion is an upwardly projecting standard or bracket 136, the upper end of which is bifurcated and receives therein in horizontal alignment with the center of the cam 134 a roller 138, best shown in Fig. 6, rotatably supported upon the pin 140. A coil spring 142 maintained under tension between the bracket 136 and an anchor member 144 mounted in the wall of the housing 74 on that side of the shaft 96 opposite the bracket 136 constantly urges the housing 74 to rotate about the axis of the shaft 64 in a direction to constantly and resiliently press the cam 134 against the roller 138. The contour of the cam 134 is such in any case, and depending upon the curvature of the tooth edge to be chamfered, that as the shaft 96 is rotated to cause reciprocation of the cutter slide 104 it simultaneously rotates the cam 134 and through the cam 134 the housing 74 is caused to oscillate about the axis of the shaft 64 so as to cause the cutter 120, in the particular case shown, to move along a curved path. It will be appreciated that the curvature of this path is controlled by the contour of the cam 134 and the contour of the cam 134 is such as to control the curvature of the path of movement of the cutting edges of the tool 120 to effect the desired depth of cut of the cutting element 120 on the edges of the teeth being machined thereby.

It will thus be appreciated that rotation of the shaft 44 causes rotation of the shaft 64 and, accordingly, the shaft 96, and rotation of the latter acting through the eccentric pin 112 reciprocation of the tool slide 104, and through the cam 134 oscillation of the housing 74 in timed relation to the reciprocatory movements of the tool slide 104. The cutter head 42 being mounted upon the slide 40 and because of the spline connection between the shaft 44 and the sleeve 54, may be moved to any position transversely of the width of the slide 36 to accommodate any size of gear within the capacity of the machine. Incidentally it may be noted at this point that the inner, or righthand end of the shaft 44 as viewed in Fig. 5 has fixed thereto a bevel gear 146 through which movement is imparted thereto in a manner which will hereinafter be described.

Figure 10:
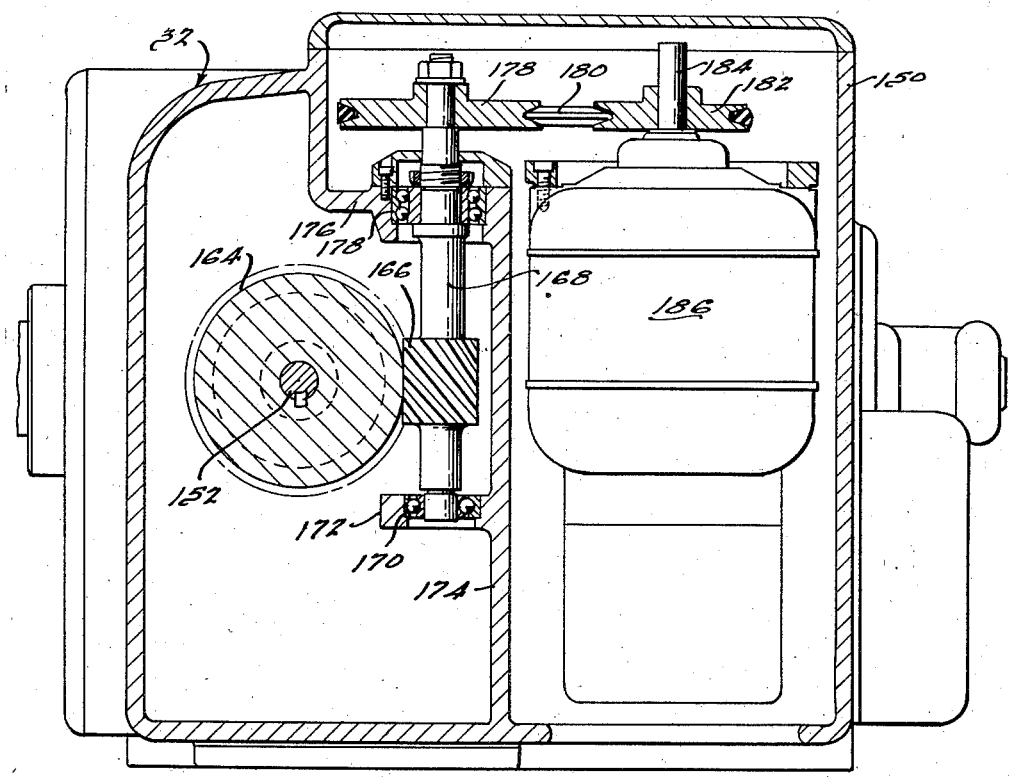
Fig. 10 is a slightly enlarged, vertical sectional view through the driving mechanism and on the line 10—10 of Fig. 9 and illustrating the connection between the prime mover and the mechanism driven thereby.
Figure 11:
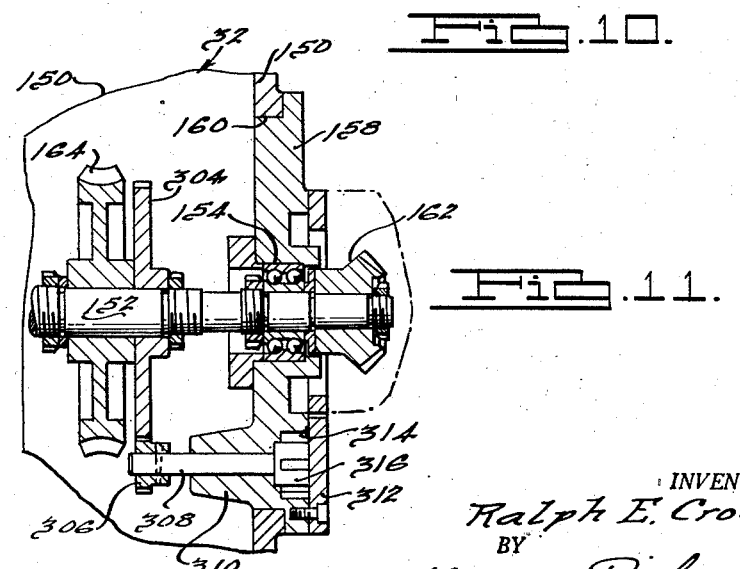
Fig. 11 is an enlarged, fragmentary vertical sectional view taken on the line 11—11 of Fig. 9.

The construction of the work head 32 is brought out in Figs. 9, 10 and 11. As there indicated it comprises a hollow housing or casing 150 within which a main drive shaft 152 is suitably supported by bearings 154 and 156. One end of the shaft 152 projects out through the back face of the housing 150 where it is supported in the bearing 154 by means of the plate or closure 158 closing the opening 160 in the housing to permit the introduction of the shaft 152 with the gears hereinafter described assembled thereto. The outwardly projecting end of the shaft 152 is provided with a bevel gear 162 fixed thereto.

The drive shaft 152 may be driven in any suitable or conventional manner but in the preferred embodiment of the invention it is provided with a worm gear 164 fixed to it between the bearings 154 and 156. The worm gear 164 meshes with a worm wheel 166 which, as best brought out in Fig. 10, is formed integrally with a vertical shaft 168 rotatably supported at its lower end by a bearing assembly 170 supported by a bracket 172 formed integrally with a vertical wall 174 preferably formed integrally with the housing 150. The wall 174 is connected at its upper end to a short transverse wall 176 which supports a bearing assembly 178 in which the upper end of the shaft 168 is rotatably supported. Above the wall 176 the shaft has fixed thereto a sheave 178 which is connected by a belt 180 with a sheave or pulley 182 fixed to the shaft 184 of an electric motor 186 disposed within the housing 150 and suitably supported therein.

Now referring to Fig. 9 it will be noted that the bearing 156 is supported in an inwardly projecting flange or bracket 190 formed integrally with the adjacent wall of the housing 150. The shaft 152 at this point is enlarged and has formed integrally therewith a bevel gear 192. The bevel gear 192 lies in mesh with a bevel gear 194 which is fixed to a shaft 196 suitably supported for rotation in bearing assemblies 198 mounted in the corresponding wall of the housing 150. The outer end of the shaft 196 carries the constantly rotating member of any suitable or conventional intermittent motion mechanism and which may, for instance, be of the conventional Geneva motion type and is so shown. In other words, the outer end of the shaft 196 has fixed thereto a disc 200 from which projects a forwardly extending pin 202 which is adapted to consecutively engage the pockets 204 in the circular member 208 mounted substantially directly below the shaft 196. The member 208 is fixed to one end of a shaft 210 extending between opposite side walls of the housing 150 in perpendicular relationship with respect to the axis of the drive shaft 152 as viewed in Fig. 9 and is provided with suitable bearings in such opposite side walls as will be appreciated. It will thus be understood that as the shafts 152 and 196 rotate at a uniform angular speed the inter-engagement of the pin 202 of the constantly rotating member 200 in consecutively engaging the pockets 204 of the member 208 will impart a step-by-step movement of the member 208 and, therefore, to the shaft 210, the character of the intermittent motion thus applied to the shaft 210, that is the angular extent of each step of angular movement of the member 210, being determined by the number of pockets 204 in the member 208.

It may be noted and as brought out in Fig. 9 that that side face of the housing 150 through which the shaft 196 projects is provided with an outstanding flange or ledge 212 which projects outwardly beyond the outer face of the member 208 and normally receives thereon a cover member 214 which cooperates therewith to form a chamber 216 between it and the corresponding side wall of the housing 150 in which the members 200 and 208 are enclosed and which also serves as an enclosure for other parts which will hereinafter be described.

The shaft 210 projects out through the wall of the housing 150 opposite to the wall just referred to and on such projecting end has secured thereto for equal rotation therewith a spur gear 218, preferably through some conventional form of mechanism such as indicated at 220 which will permit its position angularly of the shaft 210 to be readily varied. Another shaft 222 is suitably supported by the housing 150 in parallel and spaced relation with respect to the shaft 210 and has non-rotatably secured thereto a spur gear 224 in the same vertical plane as the gear 218. Between the shafts 210 and 222 is a stub shaft 226 mounted in a conventional manner, as in a shiftable slotted member 227, for shiftable movement between the shafts 210 and 222, and the stub shaft 226 rotatably supports an idler gear 228 which lies in mesh with both the gears 218 and 224 and, therefore, serves to provide a driving connection between them. The connection between the shafts 210 and 222 is, therefore, similar to the feed gearing conventionally employed on lathes between the spindle and the feed screw and is not believed to require a detailed showing and description of the same for that reason. However, it will be appreciated that this gearing, similar to such feed gearing of a lathe, permits substitution of the various gears so as to permit any desired driving ratio to be established between the shafts 210 and 222.

To the left of the shaft 222 as viewed in Fig. 9 and parallel therewith is the work spindle 230 which comprises a relatively large and heavy shaft rotatably supported in one side wall of the housing 150 by a bearing assembly 232 and in the intermediate wall 234 formed integrally with the housing 150 by the bearing assembly 236. Fixed to the spindle 230 between the bearings 232 and 236 is a relatively large spur gear 238. The gear 238 lies in mesh with a gear 240 fixed to the inner end of the shaft 222. Thus the spindle 230 is drivingly connected to the intermittently rotatable shaft 210.

The outer end of the spindle 230 is enlarged as at 242 and projects out through the cover member 214 which is sealed with respect thereto by suitable packing means 244. At its inner end the large portion 242 is provided with a peripheral flange 246. Fixed to the enlarged end 242 within the chamber 216 and against the flange 246 is a relatively large wheel or disc 248 having an axially directed annular flange 250 in which a plurality of pins 252 are secured and from which the pins project axially inwardly beyond the inner edge of the flange 250. The pins 252 are equally angularly spaced with respect to each other about the axis of the wheel or disc 248 and it will be understood that there are as many pins 252 as there are teeth on the gear to be chamfered, shown as the gear 254. The pins 252 serve as a part of the mechanism for locking the spindle 230 and, therefore, the gear 254 to be chamfered and carried thereby for a chamfering operation in each successive position of rotation thereof required to bring the successive teeth of the gear 254 into cooperative relationship with respect to the cutter 120 on the cutter or shaper head required for the chamfering operation.

To utilize the pins 252 as a means for positively locking the spindle 230 in each of its angularly shifted positions the following mechanism is provided. At the inner end of the shaft 152 a rod or shaft 254 is mounted for reciprocatory movement in a direction parallel with the axis of the spindle 230 and in line with that circle of the flange 250 of the wheel or disc 248 on which the axes of the various pins 252 are located. The inner end of the shaft 254 is supported in a bearing 256 carried by an extension 258 of the bracket 190, and its outer end is reciprocably mounted in a removable bushing 260 projected through the corresponding side wall of the housing 150. Intermediate its ends the shaft 254 is enlarged as at 262 and is provided with a transverse slot 264 therein. A pin 266 is fixed in the enlarged inner end of the shaft 152 in eccentric relation with respect to the axis thereof and projects axially outwardly beyond such end where it receives thereon a roller 268 which is relatively closely received in the slot 264 of the shaft 254. It will thus be appreciated that as the shaft 152 rotates the connection between it and the shaft 254 will cause the shaft 254 to reciprocate.

The outer end of the shaft 254 is bored out as indicated at 270 to a diameter to relatively closely receive a pin 252 therein and the length of the shaft or rod 254 is such that when the shaft 254 is at the outer limit of its reciprocatory movement its outer end projects into close but preferably slightly spaced relation with respect to the rim 250 of the wheel or disc 248. The relative position of the pins 252 on the wheel or disc 248 are such that they are brought, one after the other, into alignment with the shaft 254 each time the Geneva movement member 208 hesitates in its rotary movement, at which time the shaft 254 moves outwardly in its reciprocable movement so as to embrace the particular pin 252 then aligned therewith and thus to positively lock the spindle 230 in a predetermined angular position and against rotation during a material portion of each complete rotation of the shaft 152, this being in timed relation to the reciprocatory and the swinging movements of the cutter blade 120 required to effect the chamfering operation on the gear teeth then positioned for engagement therewith. It will be appreciated that in the broader aspects of the invention the mechanism just described is indicative of any suitable mechanism for positively locating and locking the spindle and the work carried thereby successively in predetermined angular positions required to position the successive teeth of the gear carried thereby for proper cooperation with the chamfering mechanism.

It will be appreciated that any suitable means may be provided for mounting the gear 254 or other workpiece upon the outer end of the spindle 230 but in order to explain the structure shown in the drawing employed for this purpose it may be noted that a fluid cylinder, which may be either an air or hydraulic cylinder and piston assembly such as 280, best shown in Fig. 9, but which is herein considered as being of the hydraulic type, is mounted on the rear end of the spindle 230 co-axially therewith. The piston rod 282 of the cylinder assembly 280 has fixed to it a rod 284 which projects through the hollow spindle 230 and beyond the forward end thereof where it is provided with a head 286. In operation the gear 254 is slipped over the head 286 and into engagement with suitable locating means on the forward end of the spindle 230, a U-washer 288 is slipped over the rod 284 under the head 286 and against the forward face of the gear 254, and then the assembly 280 is operated to retract the piston therein and thus to clamp the gear 254 against the end of the spindle 230. The control for the cylinder 280 may be disposed at any suitable position for the convenience of the operator of the machine, and is illustrated as comprising a foot operated pedal 288 in Figs. 1 and 16.

As illustrated in the latter figure the pedal is pivoted to the base 30 at 290 and operates a valve 292 through a rod 294 and lever 296, the valve 292 being connected to the cylinder 280 through tubes 298 and 300 as shown in Fig. 15. The source of liquid under pressure is connected to the valve 292 by means of the tube 302. It will also be noted in Figs. 9 and 11 that the drive shaft 152 has fixed to it axially outwardly of the worm wheel 164 a spur gear 304. The spur gear 304 lies in mesh with a pinion 306 mounted on a shaft 308 rotatably supported in the boss 310 formed on the upper inner face of the closure or cover 158 in which the outer end of the drive shaft 152 is rotatably supported. The outer end of the shaft 308 projects into a pocket formed in the outer face of the closure 158 and which pocket is in turn closed by a removable cover 312, forming a pumping chamber 314. An impeller 316 is fixed to the shaft 308 within the chamber 314 and cooperates with the walls of the pump chamber 314 to provide a fluid pressure pump. The inlet side of the pump thus formed is connected to a suitable lubricant reservoir (not shown) and which, for instance, may be located either in the lower portion of the housing 150 or in the base 30. The discharge side of the pump thus formed is connected by suitable ducts (not shown) with the various wearing surfaces of the movable parts in the work head 32.

A separate oiling system for the cutter or shaper head 42 and its associated mechanism is also provided. This is accomplished, as best brought out in Figs. 5 and 13, by projecting the end of the shaft 44 outwardly beyond the forward face of the slide 36 where it is enclosed by a housing member 320 removably secured to such face. Within the housing member 320 the shaft 44 has fixed thereto a cam 322. The housing 320 has formed therein a bore 324, forming a cylinder and arranged with its axis in perpendicular and intersecting relationship with respect to the axis of the shaft 44. Reciprocably received in the bore 324 is a piston member 326 which is constantly urged into engagement with the cam 322 by means of a coil spring 328 held under compression between the piston 326 and a plug 330 threaded into the outer end of the bore 324. Suitable check valve controlled inlet and outlet ports (not shown) opening onto the bore 324 between the piston 326 and the plug 330 connect, respectively, with a suitable source of lubricant and with passages leading to the various wearing surfaces of the mechanism within and supported by the slide 36. Such passages are, for instance, illustrated as the bores 332 and 334 in Fig. 5, the bores 336 and 338 in Fig. 7, and the bore 340 in Fig. 8, and others.

In order to drive the mechanism associated with the cutter or shaper head 42 from and in timed relation with respect to the mechanism within the work head 32 the following mechanism is provided. As best brought out in Fig. 2 a housing 350 is rotatably mounted upon the outer end of the shaft 152 about the bevel gear 162 secured thereto. Likewise a housing 352 is rotatably mounted upon the outer end of the shaft 44 and about the bevel gear 146 thereon. A shaft 354 arranged with its axis perpendicular to the axes of the shafts 44 and 152 is rotatably mounted in the housing 350 and suitably maintained against axial movement with respect thereto, and fixed to the shaft 354 within the housing 350 is a bevel gear 356 in meshing relationship with respect to the gear 162.

The housing 352 rotatably supports a bevel gear 358 therein and holds it against axial movement. The exterior of the shaft 354 is splined as indicated at 360 and the bore of the gear 358 is complementarily splined for reception thereof so as to be relatively non-rotatable but axially slidable with respect thereto. The gear 358 lies, of course, in meshing relationship with respect to the bevel gear 146 so that rotation of the drive shaft 152 in the work head causes simultaneous rotation of the shaft 44 through which the drive to the cutter or shaper head is imparted.

The ratio of the gearing between these two last-mentioned heads is such that one complete cycle of operation, that is a complete reciprocation of the cutter slide 104 and the cutter blade 120 carried thereby, in both directions, will be effected each time the spindle 230 is moved through the increment of angular movement thereof determined by the Geneva drive mechanism therefor, so as to permit a machining operation to be carried out on each tooth of the gear 54 in turn as it is brought into operative relationship with respect to the cutter blade 120. Regulation of the reciprocatory movement of the cutter blade 120 so as to be of proper phase with the positioning of the teeth of the gear 254 may be accomplished in any suitable manner, such as by shifting the position of the member 220 with respect to the gear 218 on the shaft 210 as previously explained.

Preferably the splined shaft 354 and the gears 162 and 356 and the gears 146 and 358 are protected against dust, dirt or the like and to this end the housing 352 is provided with a cylindrical extension 362 within which the free end of the shaft 354 may project and within which it is housed when so projected. Between the housings 350 and 352 is a housing 364 formed of relatively telescoping parts sealed to the housings 350 and 352 and surrounding the shaft 354 therebetween. The telescoping sections permit extension and contraction of the housing 364 between the housings 350 and 352 during shifting of the slide 36 longitudinally of the ways 34 as will be appreciated, and the splined connections between the shaft 354 and the gear 358 maintains the operative driving relationship between these parts during such shifting movement.

With the above described mechanism in mind it will be appreciated that the work or gear 254 is intermittently rotated to bring each tooth thereof into a predetermined position to be operated upon by the cutting element 120 and each time the gear 254 comes to rest after each intermittent rotary motion the tool slide 104 carrying the plate 118 and cutting element 120 will be reciprocated to bring the cutting element into engagement with at least one tooth of the gear 254 and the cutter or shaper head 42 will be simultaneously rotated to cause the cutting edges of the cutting element 120 to move in a curved path the shape of which is so controlled as to remove the desired amount of metal from the outer corners of each tooth thus engaged by the cutting element. The relative movement between the cutting element and the gear teeth is best brought out in sheet 9 of the drawings, namely in Figs. 18, 19, 20, 21 and 22 shown thereon and at least in some of which the relation of the parts are shown in more or less diagrammatic manner to facilitate the description thereof and to make it more easily understood.

Now as previously mentioned and as will be appreciated by those skilled in the art the relation of the parts, the shape of the cutting edges of the cutting element, and the control of the path of movement of the cutting edges of the cutting elements with respect to the teeth of the gear may be such that one edge of one tooth only may be operated upon at one time, the opposite edges at one end of one tooth may be simultaneously chamfered or, and as shown by way of illustration, the adjacent edges of adjacent teeth may be simultaneously chamfered. Either of the last two procedures are preferable in the interests of greater production.

With the above explanation in mind it will be noted that in such case the cutting element 120 is of a truncated V section so as to provide at one end thereof cutting edges 370. The cutting element 120 is mounted with its broad face or base in flat contacting relationship with respect to the plate member 118 on the tool slide 104 and with its center line in a horizontal plane including the axis of the spindle 230 and, therefore, of the gear 254 to be operated upon, and the gear 254 is so angularly related with respect to the spindle 230 that in its at rest position two adjacent teeth, or at least the ends of two adjacent teeth which are to be chamfered are located equidistant on either side of said plane. Preferably, although not necessarily, as best brought out in Fig. 20 which illustrates the position of the cutter or shaper head shortly after it has started on a cutting stroke and about the time the cutting element begins to engage the cooperating teeth of the gear 254, the plane of reciprocation of the tool slide 104 is approximately parallel to the plane including the edges of the two teeth which are about to be chamfered. Where these teeth are the teeth of a spur gear as illustrated in Figs. 18 to 22, inclusive, such plane is the plane of one axial face of the gear. Also, when it is a spur type of gear whose teeth are to be chamfered, the slide 36 is positioned on the ways 34 so as to effect initial contact between the cutting element 120 and the cooperating teeth of the gear 254, near the back or widest face of the cutting element 120, that is, at a point in the thickness of the cutting element 120 where the cutting edges 370 are more widely spaced from one another and as brought out in Fig. 18, as well as in Fig. 20.

It will be appreciated that if the cutting element 120 was permitted to continue its reciprocatory movement in its initially positioned direction the cutting element 120 would simply gouge or remove an ever increasing amount of metal from the teeth of the gear as its reciprocation in an operative or cutting direction proceeded, whereas it is assumed and as will ordinarily be the case, that a constant depth or cross-sectional area of metal is desired to be removed along substantially the full depth of each tooth to provide a constant width of chamfered surface. It is, therefore, necessary to withdraw the end of the cutting element 120 axially away from the gear 254 as the cutting element moves inwardly of the teeth towards the axis of the gear in order to bring those portions of the cutting edges more closely spaced from one another into effective cutting position, and at a rate of movement commensurate with the cross-sectional contour of the space between the teeth of the work gear. In the particular case so far described and as specifically illustrated in Figs. 1 to 8, inclusive, this withdrawal movement of the operative end of the cutting element 120 is effected by pivoting the cutter or shaper head 42 about the axis of the shaft 64 through the medium of the cam 134 acting through the roller 138 on the bracket 136. Thus the cutting element 122 as it moves inwardly towards the axis of the gear 254 is moved axially away from the gear 254 so that, and as brought out in Fig. 19, a constant amount of metal is removed from the edges of the two engaged teeth of the gear 54 to provide a constant amount of chamfer, illustrated in Fig. 19 as at 372, on each such edge.

The cross-sectional contour of the cutting element 120 and the swinging movement thereof about the axis of the shaft 64, being a movement transverse to the direction of the first described reciprocatory movement, are so related that the cutting action is continued for the full depth of the teeth on the gear and preferably into the metal spacing the bottom of the teeth as particularly brought out at 374 in Fig. 22. It will be appreciated that if it is not desired to provide a constant width of chamfer over the length of the teeth of the gear being operated upon, all that is necessary is to vary the contour of the cam 134 to provide any desired result in this respect within reasonable limits.

The reciprocatory movement imparted to the cutting element 120 through the eccentric pin 112 and link 116 is preferably such as to carry the operative end of the cutting element 120 radially inwardly of the gear beyond the base of the teeth thereof, as brought out in Fig. 22 and it is important to note, and as brought out in Fig. 22, that the pivotal movement of the cutter or shaper head 42 is a counterclockwise direction and as caused by the cam 134 is continued beyond the time that the tool slide 104 and cutting element 120 begin their reciprocation in a return direction or non-operating stroke, this being, as will be appreciated, for the purpose of pulling the cutting edges of the cutter element 120 away from the work during the return stroke so that the cutting element will not drag on the work at such time. Thus in effect the path of movement of the cutting edges 370 of the cutting element 120 during a complete cycle of operation is along a closed curved path part of which is indicated by the dot-and-dash lines 376 in Fig. 22, the opposite sides of which are generally spaced from one another.

It will thus be understood from the foregoing that in the particular case illustrated each time the cutter element 120 passes through a complete cycle of reciprocation and movement transversely thereof it completely chamfers the adjacent corners of a pair of adjacent teeth of the gear 254 engaged thereby, and that after it has withdrawn from engagement with such teeth of the gear the indexing mechanism previously described rotates the gear 254 through a sufficient angular distance so that upon the next reciprocatory movement of the cutting element it will chamfer the next two edges of the gear teeth thus positioned to be acted upon thereby.

It will be appreciated that the same general relation of parts and relative movements described in connection with the chamfering of spur tooth gears and as above discussed in connection with Figs. 18 to 22, inclusive, is observed in the chamfering of the teeth of bevel gears. For instance, in Fig. 23 a bevel gear 380 having teeth 382 is more or less diagrammatically illustrated. It is assumed that the same cutting element 120 is employed in this case as in the previous case. The only change required in this connection and as brought out by comparison with Fig. 20 for instance with Fig. 23, is that the cutter or shaper head 42 in this case will be swung around on the base 58 from a position in which the tool slide 104 is positioned at the initiation of its strike in an operative direction from a plane parallel with the plane of the end of the gear to a position parallel with the general plane of the ends of the two gear teeth 382 to be operated upon thereby and which in this case is at an angle of less than 90 degrees with respect to the axis of the gear. The path of movement of the operative end of the cutting element 120 will, however, follow a path such as 376 which may be identical to the path of movement previously described particularly where the outer ends of the teeth 382 are of the same dimensions and contour as the cross-sectional dimensions and contour of the teeth of the gear 254 previously described. The edges of the teeth 382 will be provided with a chamfer 384 substantially identical with the chamfer 372 previously described.

In Fig. 23 the operation is shown as being in connection with the axially outer edges of the teeth of a bevel gear. In Fig. 24 the operation is shown as being conducted in connection with the axially inner edges of the teeth 386 of the bevel gear 388 and in view of the similarity of the operations it is not believed necessary to go into a detail explanation of the same.

The present invention is adapted to perform a chamfering operation which has heretofore been exceedingly difficult if not commercially impractical. It may be accomplished by the use of the present invention just as readily as in the case of spur gears. This is in connection with the chamfering of the inner ends of the teeth of internal gears which are provided with a wall or flange adjacent such inner end thereof. For instance, and as illustrated in Fig. 25 a member 390 is illustrated as being provided with an internal gear 392 formed integrally therewith and projecting from one side thereof, the internal gear 392 having radially inwardly directed teeth 394. In this case the part 390 may be mounted on the end of the spindle 254 so that the internal gear 392 is concentric therewith and positioned so as to open axially outwardly therefrom. In such case a holder such as 396 is substituted in place of the cutting element 120 previously described. In other words, the holder 396 is clamped between the plate 118 and the clamping member 122. It projects forwardly therefrom and is provided with an arm 398 which projects axially inwardly of the gear 392 and the cutting element, which at least in some cases may be identical to the cutting element 120 and is so designated in Fig. 25, is fixed to the inner end of the arm 398 preferably in parallelism to the base of the holder. The slide 36 in such case is adjusted on the ways 34 so as to bring the cutting element 120 into position to engage the axially inner ends of the teeth 394 and, of course, in such case the cutting element 120 is reversed in position from that shown in Fig. 18, for instance. In this case inasmuch as it is the axially inner ends of the teeth 394 to be chamfered the contour of the cam 134, or at least its rotatable position with respect to the eccentric pin 112 on the shaft 96 is so changed that the operative end of the cutting element 120 instead of swinging axially outwardly away from the end of the spindle 230 will swing axially inwardly thereof as the tool slide 104 moves on its operative stroke, thus to make the operative end of the cutting element 120 follow a path illustrated in Fig. 25 at 400 which is similar to but reversed in direction from the path 376 previously described. Additionally, in this case it will be appreciated that inasmuch as the tool slide 104 and cutter element 120 in moving on their operative strokes will move away from the axis of the gear 392 instead of toward it as in the previously described cases, the slide 40 will be shifted on the dovetail 38 from the position which it will assume in connection with the first described gear to a position to accommodate it to the instant problems.

It has heretofore been stated that it is preferable in the chamfering of the teeth of spur or internal gears with the apparatus of the present invention that the cutter or shaper head 42 be positioned so that the initial reciprocatory movement of the tool slide is in a plane perpendicular to the axis of the gear. This is true although it will be also appreciated that by suitably shaping the cutting element and the cam 134 such initial reciprocatory movements may be in, or substantially in, a plane parallel to the axis of the gears. Particularly where it is desired to chamfer the ends of the splines formed either on the exterior of a shaft or the like or in the bore of a part, and which parts may, of course, be likened to a gear element, the latter arrangement will usually be found preferable. For instance and as illustrated in Fig. 26, a part 402 is illustrated as being provided with a bore concentric therewith provided with a plurality of splines 404 of a conventional nature. In other words, the splines 404 are of equal radial depth and equally angularly spaced with respect to each other about the bore of the part 402. In this case it is assumed that it is desired to chamfer the outer ends of the splines 404 to provide such splines with a relatively long, narrow nose or end.

In the case last considered it will be appreciated that the member 402 will be mounted on the spindle 230 concentrically therewith. In this case the cutter or shaper head 42 will be swung around upon the base 58 so that the tool slide 104 at the initiation of its reciprocatory movement in an operative direction will reciprocate in a direction approximately parallel with the axis of the member 402 and spindle 230. The cutting element 406 employed in this case in place of the cutting element 120 previously described may be of a modified conformation and the contour of the cam 134 may be modified if desired so as to impart either straight or curved sides or chamfers to the ends of the splines 404, the path of movement of the operative end of the cutting element 406 in such case being along a curve somewhat such as indicated at 408 in Fig. 26.

In the operation of a device of the present invention it is preferable, if not necessary in all cases, to withdraw the cutter or shaper head 42 away from the work, such as the gear 254, upon the completion of a chamfering operation on a piece of work so as to more readily permit the gear or other work to be unloaded from the spindle 230 and to permit its replacement by a new piece of work. To effect this operation a hydraulic cylinder and piston assembly 410, shown in Figs. 2 and 17, is fixed to the base 30 between the ways 34 and with its axis parallel to the ways. The piston rod 412 of the assembly is concentrically secured to a screw 414 which projects toward the righthand end of the base 30 as viewed in Figs. 1 and 2. As best brought out in Fig. 12 the slide 36 is provided with a depending boss 416 in which a nut member 418 is rotatably mounted and held against axial movement concentrically with the screw 414. The nut member 418 is provided with a hand wheel 420 by means of which the nut member may be rotated thereby to vary the position of the slide 36 on the ways 34 relative to the piston 422 (Fig. 17) of the assembly 410. Suitable means which will hereinafter be described are provided for controlling the entrance and discharge of liquid from opposite ends of the assembly 410 and thereby to control the slidable position of the slide 36 on the ways 34. By rotating the hand wheel 420 when the slide 36 is at the inner end of its shiftable position under the influence of the assembly 410 the position of the cutting element 120 axially of the work 254 may be readily varied. Such adjustment will, of course, have to be made each time the character of the work being operated on is changed as, for instance, when one size and particularly thickness of gear being chamfered is replaced by a different size, and particularly a gear of different thickness, to be chamfered.

While any suitable means may be employed to limit the inward movement of the slide 36 and parts carried thereby under the influence of the cylinder and piston assembly 410, it may be assumed in the present case that the extent of such inward movement is limited by contact of the piston 422 in the assembly 410 with the inner end of the cylinder thereof.

In order to operate the assembly 410 and thus effect shifting of the slide 36 and parts carried thereby on the ways 34 as desired a liquid pump 430, shown in Figs. 15 and 17, and driven by an electric motor 432 is mounted in the base 30. Its suction side is connected by a pipe 434, into the bottom of an oil reservoir 436 preferably through a filter 438. The oil reservoir 436 may be formed either separately from or integrally with the base 30 and preferably within the same but preferably, as brought out in Fig. 16, is formed integrally within the base 30. The discharge pipe 302 from the pump 430 not only leads to the valve 292 for controlling the movement of the cylinder and piston assembly previously described but is provided with a branch 440 which leads to a conventional type of solenoid operated four-way valve indicated generally at 442 which is provided with leads 444 and 446, respectively, extending to opposite ends of the cylinder and piston assembly 410, as well as the lead 448 leading back to the reservoir 436. It will also be noted from an inspection of Fig. 17 that the valve 292 is likewise provided with a discharge line 450 leading back to the reservoir 436.

The valve 442 while shown in more or less detail in Fig. 14 is a conventional type of four-way valve including an axially shiftable valve member 452 constantly urged toward one limit of its travel by spring means 454 and a solenoid 456 which when energized is adapted to shift the valve 452 to the opposite limit of its travel in opposition to the spring 454. Inasmuch as this is a conventional valve and operates in a conventional manner no further description of the same is deemed necessary excepting to explain that it is assumed in the present case that when the valve 442 is energized the valve element 452 thereof is shifted to a position to introduce liquid under pressure from the pump 430 to the lead 444 which will move the slide 36 and the cutter or shaper head 42 carried thereby into operative position with respect to a piece of work such as the gear 254, and that when de-energized the valve will connect the pump with the lead 446 thereby to move the slide 36 and the cutter or shaper head 42 away from the work so as to permit the work to be unloaded from the spindle 230 and to be replaced by a new piece of work.

Any suitable means may be provided for controlling the valve 442. For instance a simple on-and-off switch may be provided for control by the operator to enable him to manually control the shifting of the slide 36 as desired. Preferably, however, the leads 460 and 462 for the solenoid 456 are connected with a conventional form of timer mechanism illustrated in Fig. 17 diagrammatically at 464 and which may be manually placed in circuit closed position as by means of a push button 466 and may be readily adjusted to break the circuit through it at the expiration of a predetermined element of time. In such case it will be appreciated that the timer 464 may be adjusted so that when it is closed by the push button 466 it will remain closed for a sufficient length of time to permit the complete machining of a piece of work and will then automatically open to cause the cutter or shaper head 42 to be shifted by the assembly 410 away from the work, in which position it will remain until the button 466 is again pressed.

It will also usually be desirable to stop the motor 186 and, therefore, the operation of both the work head or cutter or shaper head during the unloading and loading operation and in order to provide for this effect the motor 186 may be connected in parallel with the valve 442 through the control timer 464 as illustrated diagrammatically in Fig. 17. Thus in such case when the push button 466 is pushed by the operator not only is the slide 36 moved into operative position with respect to the work but the mechanism in the work head and of the cutter or shaper head is simultaneously put into operation.

It will be appreciated that in some cases, and particularly in a case such as illustrated in Fig. 25 where the cutter works axially inwardly of a radially extending face or part, it is necessary to insure that the tool has been withdrawn radially inwardly or outwardly beyond such face before the cutter or shaper head is withdrawn away from the work head. Otherwise the cutter might stop in a position in which it is axially behind such surface when the cutter or shaper head is withdrawn from operative position and cause possible damage to the work or machine. To guard against any such condition it is preferable to provide some means for stopping the driving motor only when the cutting tool has been withdrawn radially to an inoperative position.

The last-mentioned feature, namely the stopping of the driving motor at a predetermined position of the tool slide 104, and, therefore, of the cutting element 120, regardless of the position of such tool slide at the moment the timer 464 operates to open the circuit through it, may be accomplished in the manner illustrated in Fig. 8 and diagrammatically in Fig. 17. In such case a conventional type of plunger switch such as 468, illustrated in Figs. 8 and 17, may be mounted in the casing 74 with its axis radial to the shaft 96. The collar 490 which surrounds the shaft 96 between the gear 98 and the bearing assembly 94 may be formed to provide peripheral cam 492 in engagement with the plunger of the switch 488, the cam 492 being formed to open the switch 498 only when the tool slide 104 is at or near the inoperative end of its stroke, and to allow the switch 488 to close at all other times. As illustrated in Fig. 17 the switch 468 is in parallel around the timer 464 so that if the timer 464 operates to open the circuit therethrough while the tool slide 104 is in a projected position the switch 468 will maintain the circuit closed until the slide moves to an inoperative position, upon which it will be opened and, therefore, fully open the circuit to the motor.

Figure 29:
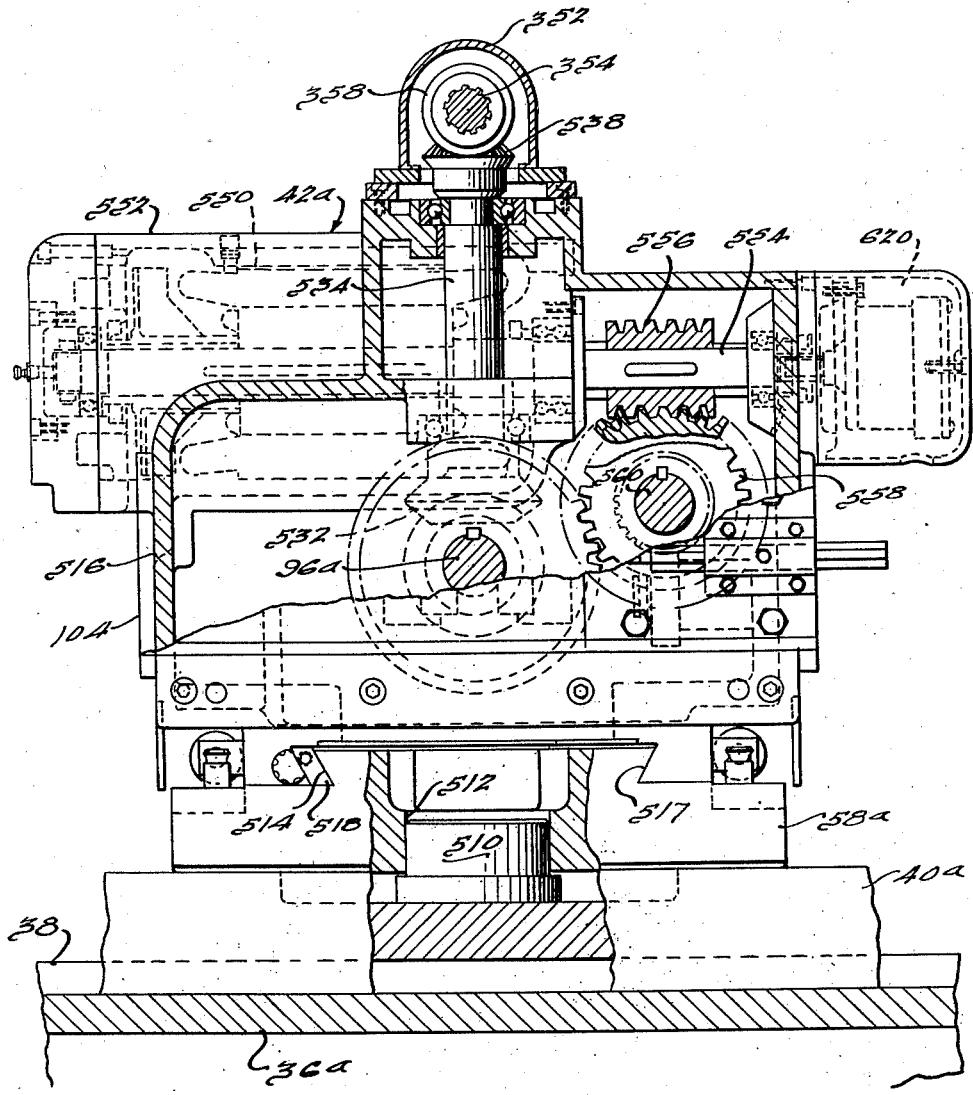
Fig. 29 is a slightly enlarged, partially broken, partially sectional view of the cutter or shaper head shown in Fig. 28 and taken looking from the lefthand face thereof as viewed in Fig. 28.

Any suitable or conventional type of brake mechanism operable to apply its braking effect on the motor when the circuit is open may be employed to stop the motor substantially immediately upon the current flowing to its being broken, and while such motor brakes are conventional and are not believed to require a showing in this particular case the plug brake shown in Fig. 29 and which will hereinafter be referred to may be considered as illustrative of a satisfactory brake for such use.

In Figs. 27 to 32, inclusive, a modified form of construction is shown which involves two main differences as compared to the construction shown in the preceding views. These differences are first, that instead of swinging the cutter or shaper head about a pivotal axis during reciprocation of the tool slide to obtain the desired curved path of travel of the cutting edges of the cutting tool, this same result is accomplished by reciprocating the cutter head in a direction transverse to the direction of reciprocation of the tool slide and simultaneously therewith. The second difference is that in this case the driving motor is carried by the cutter or shaper head instead of by the work head and the work head is, therefore, driven from the cutter head instead of vice-versa as in the first described construction.

It will be understood that in this modified form of construction the base 30 is identical to the base first described and that the slide 36a thereon may be identical to the slide 36 first described except that in this case the shaft 44 is eliminated as well as the oil pump driven by the forward end thereof. The work head 32a may be identical to the work head first described except that in this case the driving motor 186 and its connections to the shaft 152 are eliminated. The shaft 152 may be retained and suitably geared to a vertical shaft such as 500 illustrated in Fig. 27 which projects up through the top of the housing 150 and to the upper end of which the gear 162 is secured instead of being secured to the shaft 152 as in the first described construction. This is the only change required in the work head.

As previously mentioned the slide 36a is substantially identical to the slide 36 previously described and is controlled on the ways 34 in identically the same manner. It is provided with a dovetail 38 on its upper face extending transversely to its direction of movement on the ways 34 in identically the same manner as in the first described construction. The slide 40a which is received upon the dovetail 38 may be identical to the first described slide 40 and is so shown except as to the method of centering the base 58a of the cutter or shaper head thereon. In this case the slide 40a is provided with a cylindrical, vertically extending pilot 510, illustrated in Fig. 29, which is closely but rotatably received within a central vertical bore 512 in the base 58a.

The base 58a is thus mounted for rotation about the axis of the pilot 510 and bore 512 and may be locked to the slide 40 in exactly the same manner as the base 58 is locked to the slide 40 in the previously described construction to permit swiveling and securement of the cutter or shaper head to any desired position about a vertical axis.

In this case the base 58a is provided on its upper surface with a dovetail 514 and the cutter or shaper head assembly is received upon the dovetail 14 for bodily slidable movement in the direction of the length of the dovetail 514. It will be noted that the dovetail 514 is disposed at right angles to the path of movement of the tool carriage 104.

The cutter or shaper head 42a in this case comprises a casing or housing 516 the lower face of which is provided with a dovetail groove 517 received upon the dovetail 514 and provided with a conventional gib 518 between two opposed side edges thereof for controlling the fit between these parts. The casing 516 rotatably supports therein by means of bearing assemblies 92a and 94a a horizontal shaft 96a similar to the shaft 96 in the first described construction and serving the same function.

The housing 516 as viewed in Figs. 28 and 30 is provided with a flat lefthand face against which a tool slide 104a, substantially smaller to the tool slide 104 in the first described construction, is slidably mounted by means of way members 106 and 108 which may be identical to those in the first described construction. It will be understood that the cutting tool may be mounted on the tool slide 104a in identically the same manner as in the first described construction. The tool slide 104a is reciprocated by the shaft 96a as in the first described construction but in this case, instead of providing an interconnecting link between the two, the enlarged head 110a of the shaft 96a is provided with an eccentric pin 112a carrying a roller 520 which is received between a pair of vertically directed spaced blocks 522 secured to the inner face of the tool slide 104a. The blocks 522 form between them a vertically directed slot in which the roller 520 is closely but slidably received. Thus it will be appreciated that in this case when the shaft 96a rotates the roller 520 on the pin 112a acting through the blocks 522 will effect reciprocation of the tool slide 104a in a manner equivalent to the manner in which the tool slide 104 in the first described construction is reciprocated.

As best brought out in Fig. 30 the shaft 96a approximately midway between the bearings 92a and 94a has fixed thereto a bevel gear 530. As best brought out in Fig. 28 the bevel gear 530 lies in meshing relationship with respect to a bevel gear 532 fixed to the lower end of a shaft 534 projecting vertically upwardly through an extension 536 formed integrally with the housing 516 and in which it is suitably rotatably mounted. Above the extension 536 the shaft 534 has fixed to it a bevel gear 538 which corresponds with the gear 146 of the first described construction. The gear 538 is connected with the gear 162a on the work head 32a by identically the same mechanism as is employed for connecting the gears 146 and 162 in the first described construction. In other words, a housing 350 surrounds the gear 162a and is pivotable about the axis of the same, and the housing member 352 surrounding the gear 538 is swivably mounted about the axis of the same. A splined shaft 354 extends between the housing 350 and 352 and has secured thereto a gear 356 in mesh with the gear 162a and also engages the bore of a gear 358 in mesh with the gear 538, the gear 358 being axially slidably but non-rotatably mounted with respect to the splined shaft 354.

As previously explained the electric motor employed for driving the machine is in this modified form of construction carried by the cutter or shaper head and the drive from it to the work head 32a is through the splined shaft 354 just described. The electric motor which is illustrated in Fig. 29 at 550 is enclosed within a cylindrical housing part 552 formed integrally with the housing or casing 516. Its horizontally extending shaft 554 is provided with a worm gear 556 fixed thereto. This worm gear 556 lies in meshing relationship with a worm wheel 558 fixed to a shaft 560 rotatably mounted in the housing 516 in spaced and parallel relation with respect to the shaft 96a. The shaft 560 has in turn fixed thereto a spur gear 562 which lies in meshing relationship with respect to a spur gear 564 fixed to the shaft 96a. Accordingly, rotation of the motor shaft 554 acts through the worm gear 556 and worm wheel 558 to rotate the shaft 560 and the latter acting through the spur gears 562 and 564 drives the shaft 96a. The shaft 96a through the bevel gears 530, 532 drives the shaft 534 and gear 538 which acts through the gears 358, spline shaft 354, gears 356 and 162a to drive the shaft 500 which, as previously explained, is operatively geared to the shaft 152 of the work head 32 thereby to drive the work head mechanism in timed relation to the cutter head.

As previously explained, in the modified form of construction under consideration the variation in the straight line movement of the cutting edges of the cutting tool through movement of the tool slide 104a is accomplished, not by pivotal movement of the cutter or shaper head about a vertical axis, but rather by reciprocatory movement of the housing 516 and the parts carried thereby longitudinally of the dovetail 514. In order to accomplish this the rear or righthand end of the shaft 96a, as in the first described construction has fixed thereto a cam, but in this case and as perhaps best brought out in Fig. 32 such cam 570 is an axial cam and not a peripheral cam. It is mounted upon a flange member 572 fixed upon the rear end of the shaft 96a and secured against relative rotation with respect thereto by means of a pin 574.

The axially forward face of the cam 570, and as brought out in Fig. 32, is machined to provide high and low points of the required nature as indicated in Fig. 32, at 576. As shown in Fig. 28 a roller 580 is fixed to the upper end of a shaft 584 freely rotatably mounted in a bracket 585 secured in longitudinally shiftable or adjustable position in the member 58a with its axis vertical and in a plane including the axis of the shaft 96a. The cooperating faces of the roller 580 and cam 570 are beveled to provide a true rolling effect therebetween. Coil springs 586, one located at each side of the dovetail 514 are each tensioned between a pin 588 fixed to the member 58a adjacent its lefthand end as viewed in Fig. 28 and between an anchoring boss 590 fixed to the casing 516 intermediate its opposite end.

It will thus be appreciated that with the above described construction rotation of the shaft 96a causes simultaneous and equal rotation of the cam 570 whose forward cam face 576 in rotating against the roller 580 causes the housing 516 and the tool slide 104a carried thereby to move rearwardly, or to the right as viewed in Fig. 28, as the high point of the cam rides up onto the roller 580, and that after such high point has passed over the roller 580 the tension of the springs 356 will draw the housing 516 forwardly or to the left as viewed in Fig. 28 to maintain contact between the cam 570 and the roller 580. It will also be appreciated that by varying the contour of the cam face 576 any desired character of movement of the housing 516 and the parts carried thereby axially of the shaft 96a may be obtained and such movement combined with the simultaneous reciprocatory movement of the tool slide 104a may be employed to obtain any desired character of curvature for the path of movement of the cutting edges of the cutting tool carried by the tool slide 104a. In other words, the cam face 576 of the cam 570 may be formed to obtain identically the same path of movement of the cutting edges of the cutter blade as illustrated at 376 in Figs. 22, 23, and 24, at 400 in Fig. 25, and at 408 in Fig. 26.

In the arrangement of the cam and rollers shown in Fig. 28 it will be appreciated that the housing 516 and parts carried thereby are positively moved rearwardly or to the right through the reactions occurring between the cam 570 and the roller 580, and that movement to the left is under the influence of the springs 586, or is impositive. This will ordinarily be the preferable arrangement where the tool is operating upon a part such as illustrated in Figs. 18 to 24, inclusive, but where, for instance, the tool is operating upon a part such as illustrated in Fig. 25, then it is preferable that the direction of positive movement of the housing 516 and parts carried there illustrated in Fig. 28 be reversed. This is simply accomplished by reversing the cam 570 upon the end of the shaft 96a and shifting the roller 580 and its supporting bracket 585 to the rear side of the cam from the position illustrated in Fig. 28. Under such circumstances the springs 586 are reversed in position to urge the housing 516 and parts carried thereby in a reverse direction from that shown in Fig. 28. Pins 592 corresponding to the pins 588 but positioned at the opposite ends of the member 58a and dovetail 514 are provided to permit this change, the springs in such case being tensioned between their respective pins 592 and the anchors 590.

As previously mentioned, in this modified form of construction the shaft 44 is eliminated from the slide 36a necessitating the elimination of the oil pump driven from the forward end of the shaft 44. In this case such oil pump is replaced by an oil pump indicated generally at 600 in Fig. 30. The oil pump 600 is suitably mounted in an aperture 602 formed in the side wall of the housing 516 and is provided with a rotatable drive shaft 604 which is driven by a pair of spiral gears one of which is illustrated in Fig. 30 at 606 mounted on the shaft 550 and driven therefrom. This oil pump 600 is, of course, connected by suitable ducts and passages to the various wearing surfaces of the shaper or cutter head 42a.

In the modified form of construction under consideration and because of the fact that the cam 570 does not utilize the peripheral surface thereof for effecting movement of the cutter or shaper head transversely of the path of reciprocatory movement of the tool slide 104a, it is possible to use the peripheral surface thereof to provide a peripheral cam for controlling a switch functioning in the same manner as the switch 468 described in connection with the first described construction. Accordingly, and as illustrated in Fig. 31 the periphery of the cam 570 over a minor portion of its angular extent is cut away from its true circular form to provide a low area illustrated at 610. A bracket 612, shown in Fig. 30, is fixed to the rear face of the cross-wall 90a of the housing 516 and has fixed thereto a switch 614. The switch 614 is mounted with the path of movement of the plunger thereof radial of the cam 570 and in this case a cam follower 616 is interposed between the plunger of the switch 614 and the periphery of the cam 570 as best brought out in Fig. 31. The follower 616 is pivotally mounted about the axis of a post 618 carried by the bracket 612 with its axis in parallelism with the axis of the cam 570. The low point 610 is so positioned with respect to the axis of the shaft 96a that as the tool slide 104a approaches its retracted position in its reciprocatory movement the low point 610 will engage the follower 616 permitting movement of the latter in a direction to allow the switch 614 to open. It will be understood that when the cam follower 616 is riding upon that portion of the periphery of the cam 570 beyond the low point 610 the switch 614 is maintained in closed position. It will also be understood that the switch 614 is connected in circuit with the motor 550 in the same general manner as the switch 468 is connected to the motor 186 in the previously described construction. However, it may be noted and as best brought out in Fig. 29 that in the present case the rear end of the motor shaft 554 has secured to it a conventional plug switch 620 which, when both the timed 464 therefor and the switch 614 are open, acts in a conventional manner to immediately lock the motor shaft 554 against rotation.

It will be understood from the above that the same control arrangement as illustrated in Fig. 17 is employed in connection with the last described modified form of construction and that outside of the two principal features of difference above pointed out and the necessary variations in detail required thereby, the construction of the modified form of device is substantially similar to the first described device and the operative effects of both are identical.

Having thus described my invention, what I claim by Letters Patent is:

1. In a machine of the class described, in combination, means for supporting a piece of work, means for intermittently rotating said work supporting means through equal angular increments, a cutter head support, a shaft rotatably carried thereby, a tool slide mounted on said cutter head for straight line movement, means operatively interconnecting said shaft and tool slide effective to reciprocate said tool slide upon rotation of said shaft, a cam secured to said shaft for rotation therewith, means fixed with respect to said cutter head support operatively engaging said cam whereby to cause movement of said cutter head with respect to said cutter head support upon rotation of said cam, and means for driving said shaft and said work supporting means in timed relation with respect to each other.

2. In a machine of the class described, in combination, means for supporting a piece of work, means for intermittently rotating said work supporting means through equal angular increments, a cutter head support, a shaft rotatably carried thereby, a tool slide mounted on said cutter head for straight line movement, means operatively interconnecting said shaft and tool slide effective to reciprocate said tool slide upon rotation of said shaft, a cam secured to said shaft for rotation therewith, means fixed with respect to said cutter head support operatively engaging said cam, spring means constantly urging said cam into contact with said fixed means whereby during rotation of said cam movement is imparted to said cutter head relative to said cutter head support, and means for driving said shaft and said work supporting means in timed relation with respect to each other.

3. In a machine of the class described, in combination, a base, ways on said base, a slide movable on said ways, fluid pressure operated means for effecting movement of said slide on said ways, a work head supported on said base at that end thereof opposite said ways, a work support rotatably mounted in said work head, means including a shaft adapted to be driven at a constant rate of rotation and intermittent motion mechanism connecting said shaft with said work support for driving said work support in intermittent angular motion, a cutter head support carried by said slide, a cutter head movably mounted on said cutter head support, a tool slide reciprocably mounted on said cutter head for straight line movement with respect thereto, means including a shaft operatively interconnected between said cutter head support and said tool slide for effecting reciprocation of said tool slide on said cutter head in timed relation with respect to movement of said cutter head on said cutter head support, means operatively interconnecting said shafts for effecting rotation of one in timed relation with respect to the other, an electric motor for driving said machine, means connected in the circuit for said motor operative upon the passage of a predetermined timed interval of operation to break the circuit through it, means connected in parallel with the last-mentioned means and controlled in timed relation with respect to the reciprocatory movements of said tool slide for rendering said last-mentioned means effective to open the circuit to said motor only when said tool slide is not in an operative position with respect to a piece of work supported by said work supporting means, and means for braking the movement of said electric motor when the circuit therethrough is broken.

4. In a machine of the class described, in combination, a base, a work head thereon, a work spindle rotatably supported by said work head, means including a shaft adapted to be driven at a constant angular speed and intermittent motion mechanism interposed between it and said work spindle for intermittently rotating said work spindle, said base having ways thereon, a slide mounted on said ways for movement toward and from said work spindle, a cutter head support carried by said slide, a cutter head carried by said cutter head support for back and forth movement thereon, a tool slide reciprocably mounted on said cutter head, a second shaft rotatably carried in said cutter head, a connection between said second shaft and said tool slide for effecting reciprocation of said tool slide upon rotation of said second shaft, means interconnecting said second shaft and cutter head support for effecting said back and forth movement of said cutter head on said cutter head support during rotation of said second shaft, means interconnecting said shafts effective to cause said shafts to rotate in timed relation with respect to each other, and an electric motor carried by said work head operatively connected to said first-mentioned shaft for driving the same.

5. In a machine of the class described, in combination, a base, a work head thereon, a work spindle rotatably supported by said work head, means including a shaft adapted to be driven at a constant angular speed and intermittent motion mechanism interposed between it and said work spindle for intermittently rotating said work spindle, said base having ways thereon, a slide mounted on said ways for movement toward and from said work spindle, a cutter head support carried by said slide, a cutter head carried by said cutter head support for back and forth movement thereon, a tool slide reciprocably mounted on said cutter head, a second shaft rotatably carried in said cutter head, a connection between said second shaft and said tool slide for effecting reciprocation of said tool slide upon rotation of said second shaft, means interconnecting said second shaft and cutter head support for effecting said back and forth movement of said cutter head on said cutter head support during rotation of said second shaft, means interconnecting said shafts effective to cause said shafts to rotate in timed relation with respect to each other, and an electric motor carried by said cutter head and drivingly connected to said second shaft for effecting rotation thereof.

6. In a machine of the class described, in combination, a base, a work head thereon, a work spindle rotatably supported by said work head, means including a shaft adapted to be driven at a constant angular speed and intermittent motion mechanism interposed between it and said work spindle for intermittently rotating said work spindle, said base having ways thereon, a slide mounted on said ways for movement toward and from said work spindle, a cutter head support carried by said slide, a cutter head carried by said cutter head support for back and forth movement thereon, a tool slide reciprocably mounted on said cutter head, a second shaft rotatably carried in said cutter head, a connection between said second shaft and said tool slide for effecting reciprocation of said tool slide upon rotation of said second shaft, means interconnecting said second shaft and cutter head support for effecting said back and forth movement of said cutter head on said cutter head support during rotation of said second shaft, means interconnecting said shafts effective to cause said shafts to rotate in timed relation with respect to each other, means for driving said shafts, a lubricating pump carried by said work head and driven by movement of a movable part thereof operative to lubricate wearing surfaces in said work head, and a lubricating pump carried by said cutter head and driven by a movable part thereof operable to lubricant wearing surfaces in said cutter head.

RALPH E. CROSS.

REFERENCES CITED

The following references are of record in the file of this patent:

UNITED STATES PATENTS

| Number | Name | Date |
|---|---|---|
| 1,063,160 | Hanson | May 27, 1913 |
| 1,518,239 | Arnold | Dec. 9, 1924 |
| 1,724,169 | Barnes | Aug. 13, 1929 |
| 1,985,409 | Hill | Dec. 25, 1934 |
| 2,260,918 | Wainwright | Oct. 28, 1941 |
| 2,276,627 | Poock et al. | Mar. 17, 1942 |
| 2,354,181 | Carlsen et al. | July 25, 1944 |

FOREIGN PATENTS

| Number | Country | Date |
|---|---|---|
| 424,433 | Great Britain | Feb. 21, 1935 |

Certificate of Correction

Patent No. 2,433,201. December 23, 1947.

RALPH E. CROSS

It is hereby certified that errors appear in the printed specification of the above numbered patent requiring correction as follows: Column 1, line 30, for the word "chambered" read *chamfered*; line 41, for "chamber" read *chamfer*; column 4, line 4, for "sectional" read *sectioned*; column 15, line 69, for "strike" read *stroke*; column 21, line 12, for "smaller" read *similar*; line 58, for "housing" read *housings*; column 24, line 20, for "timed" read *timer*; and that the said Letters Patent should be read with these corrections therein that the same may conform to the record of the case in the Patent Office.

Signed and sealed this 16th day of March, A. D. 1948.

[SEAL]

THOMAS F. MURPHY,
*Assistant Commissioner of Patents.*